(12) United States Patent
Jeon et al.

(10) Patent No.: US 8,393,230 B2
(45) Date of Patent: Mar. 12, 2013

(54) CONTACTLESS TORQUE SENSOR FOR STEERING SYSTEM

(75) Inventors: Chang-Nam Jeon, Suwon-si (KR); Seag-Woo Lee, Gunpo-si (KR)

(73) Assignee: Daesung Electric Co., Ltd. (KR)

(*) Notice: Subject to any disclaimer, the term of this patent is extended or adjusted under 35 U.S.C. 154(b) by 317 days.

(21) Appl. No.: 12/919,445

(22) PCT Filed: Jun. 16, 2009

(86) PCT No.: PCT/KR2009/003229
§ 371 (c)(1),
(2), (4) Date: Aug. 25, 2010

(87) PCT Pub. No.: WO2009/157666
PCT Pub. Date: Dec. 30, 2009

(65) Prior Publication Data
US 2011/0005340 A1 Jan. 13, 2011

(30) Foreign Application Priority Data

Jun. 26, 2008 (KR) .................... 10-2008-0060701
Dec. 1, 2008 (KR) .................... 10-2008-0120235

(51) Int. Cl.
*G01L 3/02* (2006.01)
(52) U.S. Cl. ............................................. 73/862.193
(58) Field of Classification Search ........ 73/862.331–862.333, 862.193
See application file for complete search history.

(56) References Cited

U.S. PATENT DOCUMENTS 4,152,617 A * 5/1979 Janson .......................... 310/103
5,313,125 A * 5/1994 Bosman et al. ............. 310/49.18
6,928,887 B2 * 8/2005 Nakane et al. ............ 73/862.331
7,044,005 B2 * 5/2006 Koyama et al. .......... 73/862.333
7,051,602 B2 * 5/2006 Nakane et al. ............ 73/862.333
7,191,669 B2 * 3/2007 Nakane et al. ............ 73/862.331

(Continued)

FOREIGN PATENT DOCUMENTS

JP 2001255218 A 9/2001
JP 2005345284 A 12/2005

(Continued)

OTHER PUBLICATIONS

PCT/KR2009/003229 International Search Report dated Feb. 17, 2010.

*Primary Examiner* — Max Noori
(74) *Attorney, Agent, or Firm* — Schmeiser, Olsen & Watts LLP

(57) ABSTRACT

The present invention relates to a contactless torque sensor for steering system which is installed between an input shaft connected to a steering wheel and an output shaft connected to vehicle wheels and detects torsion generated by rotational manipulation of the steering wheel. The torque sensor comprises a magnetism generation unit coupled with the input shaft wherein north and south pole magnets are arranged along an outer circumference, a cylindrical magnetic shielding unit connected to the output shaft and comprising holes placed near the magnets, a magnetic detection unit distanced from the outer circumference of the magnetic shielding unit and detecting magnetism passing through the holes, and a magnetic detection sensor placed on an outer circumference of the magnetic detection unit and detecting torsion of the magnetism generation unit and magnetic shielding unit. The present invention allows detecting torque of the output shaft with magnetism induced only once.

33 Claims, 19 Drawing Sheets

U.S. PATENT DOCUMENTS

| | | | |
|---|---|---|---|
| 7,293,472 B2 * | 11/2007 | Tokumoto et al. | 73/862.331 |
| 7,549,467 B2 * | 6/2009 | McDonald et al. | 166/66.4 |
| 7,562,590 B2 * | 7/2009 | Tokumoto et al. | 73/862.331 |
| 7,568,400 B2 * | 8/2009 | Tokumoto et al. | 73/862.333 |
| 7,707,900 B2 * | 5/2010 | Ishihara et al. | 73/862.193 |
| 7,845,244 B2 * | 12/2010 | Aoki et al. | 73/862.335 |

FOREIGN PATENT DOCUMENTS

| | | |
|---|---|---|
| JP | 2006052969 A | 2/2006 |
| JP | 2006118875 A | 5/2006 |
| JP | 2006292423 A | 10/2006 |

* cited by examiner

CONTACTLESS TORQUE SENSOR FOR STEERING SYSTEM

TECHNICAL FIELD

The present invention relates to a contactless torque sensor for a steering system, and more particularly, to a contactless torque sensor for a steering system which enables an output shaft to rotate in the same way with an input shaft in order to enhancing a steering force when the input shaft rotates due to an operation of a steering wheel.

BACKGROUND ART

Generally, a vehicle wheel which is in contact with a road surface rotates according to a rotation of a steering wheel during traveling or stopping of a vehicle. That is, when the steering wheel rotates to the left or right, the vehicle wheel rotates in the same direction.

However, as the vehicle wheel is in contact with the road surface, there may be a problem that rotation amounts between the steering wheel and the vehicle wheel become different with each other due to a friction generated between the vehicle wheel and the road surface.

To solve this problem, a torque sensor is provided to measure and compensate a deviation in a rotation angle between the steering wheel and the vehicle wheel.

That is, the torque sensor is a device that measures the deviation in a rotation angle between the steering wheel and the vehicle wheel and allows an additional driving means to rotate the vehicle wheel as much as the measured deviation, so that the vehicle can be steered safely and accurately in a direction as intended thus enhancing a steering convenience.

The torque sensor is generally classified into a contact type and a contactless type. However, as the contact type has a problem of a noise generation and an inferior durability, the contactless type has been preferred recently.

The contactless type torque sensor is classified into a magnetic resistance detection type, a magnetic deformation detection type, a capacitance detection type and an optical detection type.

A conventional magnetic resistance detection type torque sensor, which is provided in an electric power steering system, has an input shaft whose upper end is coupled to the steering wheel operated by a driver and an output shaft whose upper end is coupled to a lower end of the input shaft through a torsion bar. A lower end of the output shaft is connected to a vehicle wheel.

The lower end of the input shaft including the torsion bar and the upper end of the output shaft are covered by a housing, which the torque sensor and the driving means described above are also provided in.

In this case, the input shaft has a permanent magnet where a polarity is changed at regular intervals.

Also, the output shaft is provided with a detection ring having a gear structure which corresponds to the polarity number of the permanent magnet and which is made from a ferromagnetic substance that can generate a magnetic induction caused by the permanent magnet provided to the input shaft.

The sensor is provided with a structure to be combined to the detection ring to detect magnetism.

Therefore, a rotation force is transmitted to the input shaft when the driver operates the steering wheel. Due to the rotation of the input shaft, the torsion bar is rotated.

As the torsion bar is coupled to the output shaft, the rotation force is also transmitted to the output shaft. Thus, the vehicle wheel is rotated in a direction in which the steering wheel is operated.

In this case, a relative twist between the permanent magnet provided to the input shaft and the detection ring of the gear structure provided to the output shaft causes a change in an area by which the permanent magnet and the detection ring face each other.

Accordingly, a magnetic flux is changed in the detection ring and the change of the magnetic flux is detected through the sensor, so that a twist angle of the output shaft relative to the input shaft can be detected.

However, as the conventional torque sensor as described above has a structure where the detection ring continually rotates around the sensor, there is a much fluctuation in the magnetic force originated from the permanent magnet, and a stationary detection ring should be additionally installed to avoid an interference between the detection ring and a magnet detection device when rotating.

Also, if the stationary detection ring is additionally installed, the magnetic flux generated from the permanent magnet is magnetically induced firstly through the detection ring and then magnetically induced secondly through the stationary detection ring.

Therefore, the magnetic flux is decreased and distorted by going through the magnetic induction two times, so that the twist between the output shaft and the input shaft cannot be detected correctly.

DISCLOSURE

Technical Problem

It is an aspect of the present invention to provide a contactless torque sensor for a steering system where a twist angle of the output shaft can be detected not by two processes of the magnetic induction but by only one process thereof.

Technical Solution

The foregoing and/or other aspects of the present invention can be achieved by providing a contactless torque sensor for a steering system, which is installed between an input shaft connected to a steering wheel and an output shaft connected to a vehicle wheel to detect a twist generated by rotational operation of the steering wheel, comprising: a magnetic force generating part coupled to the input shaft and having a plurality of N pole magnets and S pole magnets alternatively on an outer circumferential surface thereof; a magnetic shield part having a shape of a hollow cylinder, coupled to the output shaft and having a plurality of holes to be located within areas of the N pole magnets and the S pole magnets; a magnetic detection part provided at a distance from an outer surface of the magnetic shield part and detecting a magnetic force passing through a plurality of the holes; and a magnetic detection sensor part located at an outer surface of the magnetic detection part to detect a change of a relative twist between the magnetic force generating part and the magnetic shield part.

According to an aspect of the present invention, the magnetic force generating part comprises a coupling part that is fixed to a lower end part of the input shaft and a magnetic attaching part that is located at a lower side of the attaching part and has a shape of a cylinder, and the a plurality of the N pole magnets and the S pole magnets are attached on an outer surface of the magnetic attaching part.

According to an aspect of the present invention, the magnetic shield part comprises a first magnetic shield part that has first through holes formed at a predetermined interval therebetween on an upper outer surface and a second magnetic shield part that has second through holes formed at a predetermined intervals therebetween on a lower outer surface to be alternatively disposed with the first through holes.

According to an aspect of the present invention, if the output shaft rotates to the same amount as the input shaft and a twist angle therebetween is zero, a border part between the N pole magnet and the S pole magnet is located at a horizontal center of the hole.

According to an aspect of the present invention, if the output shaft rotates to its maximum amount in the left or in the right with regard to the input shaft, one of the N pole magnet and the S pole magnet is exposed through the first through hole and the other of the N pole magnet and the S pole magnet is exposed through the second through hole.

According to an aspect of the present invention, each of the first through holes and the second through holes has the same hole area.

According to an aspect of the present invention, a height of an upper end of the N and S pole magnets and the height of an upper end of the magnet detection part are the same as that of an upper end of the first through hole, and a height of a lower end of the N and S pole magnets and the height of the lower end of magnet detection part are the same as that of a lower end of the second through hole.

According to an aspect of the present invention, a height of an upper end of the N and S pole magnets and the height of an upper end of the magnet detection part are different from that of an upper end of the first through hole, and a height of a lower end of the N and S pole magnets and the height of the lower end of magnet detection part are different from that of a lower end of the second through hole.

According to an aspect of the present invention, the magnetic detection part comprises a first magnetic detection member that detects a magnetic force passing through the first through holes, and a second magnetic detection member that is located at a distance from a lower side of the first magnetic detection member and detects the magnetic force passing through the second through holes.

According to an aspect of the present invention, the magnetic detection part further comprises a first magnetic collecting ring provided at an outer surface of the first magnetic detection member and a second magnetic collecting ring provided at the outer surface of the second magnetic detection member to maximize the magnetic force induced by the magnetic force generating part.

According to an aspect of the present invention, one or more of the magnetic detection sensor part is coupled to the first magnetic collecting ring and the second magnetic collecting ring.

According to an aspect of the present invention, the magnetic detection part comprises a first protruding member that protrudes from an outer surface of the first magnetic collecting ring in an outer direction and a second protruding member that protrudes from the outer surface of the second magnetic collecting ring in the outer direction to correspond vertically to the first protruding member, and the magnetic detection sensor part is located between the first protruding member and the second protruding member.

According to an aspect of the present invention, the first protruding member is provided as a plural number at the outer surface of the first magnetic collecting ring, the second protruding member is provided as a plural number at the outer surface of the second magnetic collecting ring, and the magnetic detection sensor part is located between each first protruding member and each second protruding member.

According to an aspect of the present invention, the magnetic shield part has the first magnetic shield part and the second magnetic shield part manufactured integrally therebetween.

According to an aspect of the present invention, the magnetic force generating part has at its upper outer surface the N pole magnets and the S pole magnets disposed alternately therebetween, and another S pole magnets are disposed at a lower side of the N pole magnets and another N pole magnets are disposed at a lower side of the S pole magnets.

According to an aspect of the present invention, the magnetic shield part has the holes at every border part of the N pole and the S pole magnets disposed at the upper outer surface and the N pole and the S pole magnets disposed at the lower outer surface.

The foregoing and/or other aspects of the present invention can also be achieved by providing a contactless torque sensor for a steering system, which is installed between an input shaft connected to a steering wheel and an output shaft connected to a vehicle wheel to detect a twist generated by rotational operation of the steering wheel, comprising: a magnetic force generating part coupled to the input shaft and having a plurality of N pole magnets and S pole magnets alternatively on an outer circumferential surface thereof; a magnetic shield part as a single hollow cylinder disposed at an radially outer side of the magnetic force generating part and coupled to the outer shaft, including an upper shield surface that has a plurality of upper through holes at an interval therebetween to be the same as that between one of the N pole magnets and the S pole magnets and a lower shield surface that has a plurality of lower through holes at an interval therebetween to be the same as that between the other of the N pole magnets and the S pole magnets; a magnetic detection part including an upper magnetic collecting member which has an upper magnetic flux collecting ring collecting a magnetic flux that passes through the upper shield surface, an upper magnetic flux collecting flange extending radially from an upper end of the upper magnetic flux collecting ring to a predetermined width and an upper magnetic collecting terminal bent from a side part of the upper magnetic flux collecting flange, and a lower magnetic collecting member which has a lower magnetic flux collecting ring collecting a magnetic flux that passes through the lower shield surface, a lower magnetic flux collecting flange extending radially from a lower end of the lower magnetic flux collecting ring to a predetermined width and a lower magnetic collecting terminal bent from a side part of the lower magnetic flux collecting flange, where a distance between the upper magnetic flux collecting ring and the lower magnetic flux collecting ring and the distance between the upper magnetic flux collecting flange and the lower magnetic flux collecting flange are longer than the distance between the upper magnetic collecting terminal and the lower magnetic collecting terminal; and a magnetic detection sensor part located between the upper magnetic collecting terminal and the lower magnetic collecting terminal to detect an intensity of a magnetic flux.

According to an aspect of the present invention, the magnetic detection part has the upper magnetic collecting flange to extend from the upper end of the upper magnetic flux collecting ring and the lower magnetic collecting flange to extend from the lower end of the lower magnetic flux collecting ring, and the upper magnetic collecting terminal extends downwardly from the upper magnetic flux collecting flange, passes through the lower end of the upper magnetic flux collecting ring and is bent and extends radially and the lower magnetic collecting terminal extends upwardly from the lower magnetic flux collecting flange, passes through the upper end of the lower magnetic flux collecting ring and is bent and extends radially to correspond to the upper magnetic collecting terminal.

According to an aspect of the present invention, the magnetic detection part further includes a magnetic collecting member holder of a non-ferromagnetic substance having a shape of a hollow cylinder and having an upper surface to be coupled to the upper magnetic collecting member and a lower surface to be coupled to the lower magnetic collecting member.

According to an aspect of the present invention, the magnetic collecting member holder has at its upper and lower surfaces an upper holder flange which is coupled to the upper magnetic flux collecting flange and a lower holder flange which is coupled to the lower magnetic flux collecting flange respectively.

According to an aspect of the present invention, the upper magnetic collecting member and the lower magnetic collecting member are coupled to the magnetic collecting member holder by insert molding.

According to an aspect of the present invention, the upper magnetic flux collecting flange and the lower magnetic flux collecting flange respectively have two kinds, in size, of combining holes which are formed to be vertically symmetrical between the upper magnetic flux collecting flange and the lower magnetic flux collecting flange, and the upper holer flange and the lower holder flange respectively have a number of penetrating holes extending vertically and corresponding to the combining holes that are formed at the upper magnetic flux collecting flange and the lower magnetic flux collecting flange.

According to an aspect of the present invention, the magnetic force generating part includes a magnet ring comprising a plurality of the N pole magnets and the S pole magnets and a magnet holder of a non-ferromagnetic substance having an attaching part which accommodates and supports the magnet ring at its outer surface and a plurality of first coupling pieces which are provided at an upper side of the attaching part and extends axially to accommodate the input shaft inside thereof.

According to an aspect of the present invention, the magnetic force generating part further includes a back yoke of a ferromagnetic substance provided between the magnet ring and the magnet holder and having a ring shape with an outer surface to be attached to the magnet ring and an inner surface to be fixedly attached to the attaching part of the magnet holder.

According to an aspect of the present invention, each first coupling piece has a connecting protrusion formed on an inner side thereof to be coupled to the input shaft and the magnetic force generating part further includes a first snap ring to prevent each first coupling piece from being bent outwardly when the first coupling pieces are coupled to the input shaft.

According to an aspect of the present invention, the magnetic shield part further includes a shield ring holder of a non-ferromagnetic substance having a holding part of a hollow cylinder shape which accommodates and supports the magnetic shield ring with an inner surface thereof and a plurality of second coupling pieces which are provided at a lower side of the holding part and extends axially to accommodate the output shaft inside thereof.

According to an aspect of the present invention, the holding part has a number of connecting protrusion formed on an inner side thereof to be inserted correspondingly into the upper and the lower through holes of the magnetic shield ring.

According to an aspect of the present invention, the magnetic shield ring is coupled to the shield ring holder by insert molding.

According to an aspect of the present invention, each second coupling piece has a connecting protrusion formed on a lower end inner side thereof to be coupled to the output shaft and the magnetic shield part further includes a second snap ring to prevent each second coupling piece from being bent outwardly when the second coupling pieces are coupled to the output shaft.

According to an aspect of the present invention, the contactless torque sensor for a steering system according further comprises an upper cover and a lower cover which are provided at the upper and lower sides to accommodate and support the magnetic force generating part, the magnetic shield part, the magnetic detection part and the magnetic detection sensor part therein.

The foregoing and/or other aspects of the present invention can also be achieved by providing a contactless torque sensor for a steering system, which is installed between an input shaft connected to a steering wheel and an output shaft connected to a vehicle wheel to detect a twist generated by rotational operation of the steering wheel, comprising: a magnetic force generating part coupled to the input shaft and having a plurality of N pole magnets and S pole magnets disposed alternatively on an upper and an lower outer circumferential surface thereof respectively and having the opposite poles between neighboring upper and lower magnets; a magnetic shield part coupled to the outer shaft and having a magnetic shield ring as a single hollow cylinder disposed at an radially outer side of the magnetic force generating part, the magnetic shield ring having a plurality of through holes each of which has a size to accommodate one upper magnet and one lower magnet therein and which are disposed in a circumferential direction at an interval therebetween to be the same as that between one of the upper magnets and the lower magnets; a magnetic detection part including an upper magnetic collecting member which has an upper magnetic flux collecting ring collecting a magnetic flux that passes through the upper shield surface, an upper magnetic flux collecting flange extending radially from an upper end of the upper magnetic flux collecting ring to a predetermined width and an upper magnetic collecting terminal bent from a side part of the upper magnetic flux collecting flange, and a lower magnetic collecting member which has a lower magnetic flux collecting ring collecting a magnetic flux that passes through the lower shield surface, a lower magnetic flux collecting flange extending radially from a lower end of the lower magnetic flux collecting ring to a predetermined width and a lower magnetic collecting terminal bent from a side part of the lower magnetic flux collecting flange, where a distance between the upper magnetic flux collecting ring and the lower magnetic flux collecting ring and the distance between the upper magnetic flux collecting flange and the lower magnetic flux collecting flange are longer than the distance between the upper magnetic collecting terminal and the lower magnetic collecting terminal; and a magnetic detection sensor part located between the upper magnetic collecting terminal and the lower magnetic collecting terminal to detect an intensity of a magnetic flux.

According to an aspect of the present invention, the magnetic detection part has the upper magnetic collecting flange to extend from the upper end of the upper magnetic flux collecting ring and the lower magnetic collecting flange to extend from the lower end of the lower magnetic flux collecting ring, and the upper magnetic collecting terminal extends downwardly from the upper magnetic flux collecting flange, passes through the lower end of the upper magnetic flux collecting ring and is bent and extends radially and the lower magnetic collecting terminal extends upwardly from the lower magnetic flux collecting flange, passes through the upper end of the lower magnetic flux collecting ring and is bent and extends radially to correspond to the upper magnetic collecting terminal.

According to an aspect of the present invention, the magnetic detection part further includes a magnetic collecting member holder of a non-ferromagnetic substance having a shape of a hollow cylinder and having an upper surface to be coupled to the upper magnetic collecting member and a lower surface to be coupled to the lower magnetic collecting member by insert molding respectively.

According to an aspect of the present invention, the magnetic force generating part includes a magnet ring comprising a plurality of the upper magnets and the lower magnets and a magnet holder of a non-ferromagnetic substance having an attaching part which accommodates and supports the magnet ring at its outer surface and a plurality of first coupling pieces which are provided at an upper side of the attaching part and extends axially to accommodate the input shaft inside thereof.

According to an aspect of the present invention, the magnetic force generating part further includes a back yoke of a ferromagnetic substance provided between the magnet ring and the magnet holder and having a ring shape with an outer surface to be attached to the magnet ring and an inner surface to be fixedly attached to the attaching part of the magnet holder.

According to an aspect of the present invention, the magnetic shield part further includes a shield ring holder of a non-ferromagnetic substance having a holding part of a hollow cylinder shape which accommodates and supports the magnetic shield ring with an inner surface thereof and a plurality of second coupling pieces which are provided at a lower side of the holding part and extends axially to accommodate the output shaft inside thereof and which is coupled to the magnetic shield ring by insert molding.

Advantageous Effects

According to the contactless torque sensor for a steering system of the present invention, a magnet of N and S poles is disposed to a magnetic force generating part which is coupled to an input shaft and a plurality of upper and lower through holes are formed in a magnetic shield part which is coupled to an output shaft.

Therefore, if there is a twist of the output shaft with regard to the input shaft, a magnetic flux of the magnetic force generating part passes through a plurality of the upper and the lower through holes formed in the magnetic shield part and reaches an magnetic detection part at an outer side and then is detected as a signal of the twist at a magnetic detection sensor part.

That is, according to a twist angle between the input shaft and the output shaft, the strength of the magnetic flux that is transmitted from the N and S poles through the plurality of the through holes is changed and passes through the magnetic detection part to be detected at the magnetic detection sensor part.

Therefore, as the magnetic flux that is generated from the permanent magnet of the magnetic force generating part is directly transmitted to the magnetic detection part through a magnetic shield ring of the magnetic shield part, there is a low possibility of decrease or distortion of the magnetic flux.

Accordingly, the twist between the input shaft and the output shaft can be detected correctly.

Also, according to the contactless torque sensor for a steering system of the present invention, as a distance between an upper magnetic flux collecting ring and a lower magnetic flux collecting ring and a distance between an upper magnetic collecting flange and a lower magnetic collecting flange are longer than a distance between an upper magnetic collecting terminal and a lower magnetic collecting terminal, a decrease in the strength of the magnetic flux that is collected and detected can be prevented.

Also, according to the contactless torque sensor for a steering system of the present invention, as the number of parts is decreased by improvement of an overall structure of the contactless torque sensor for a steering system, a manufacturing cost can be decreased.

Also, a manufacturing time can be reduced due to a reduction of manufacturing processes to be required.

BEST MODE

Hereinafter, a constitution and an operation of a contactless torque sensor for a steering system according to a first exemplary embodiment of the present invention is described by referring to attached figures.

Figure 1:
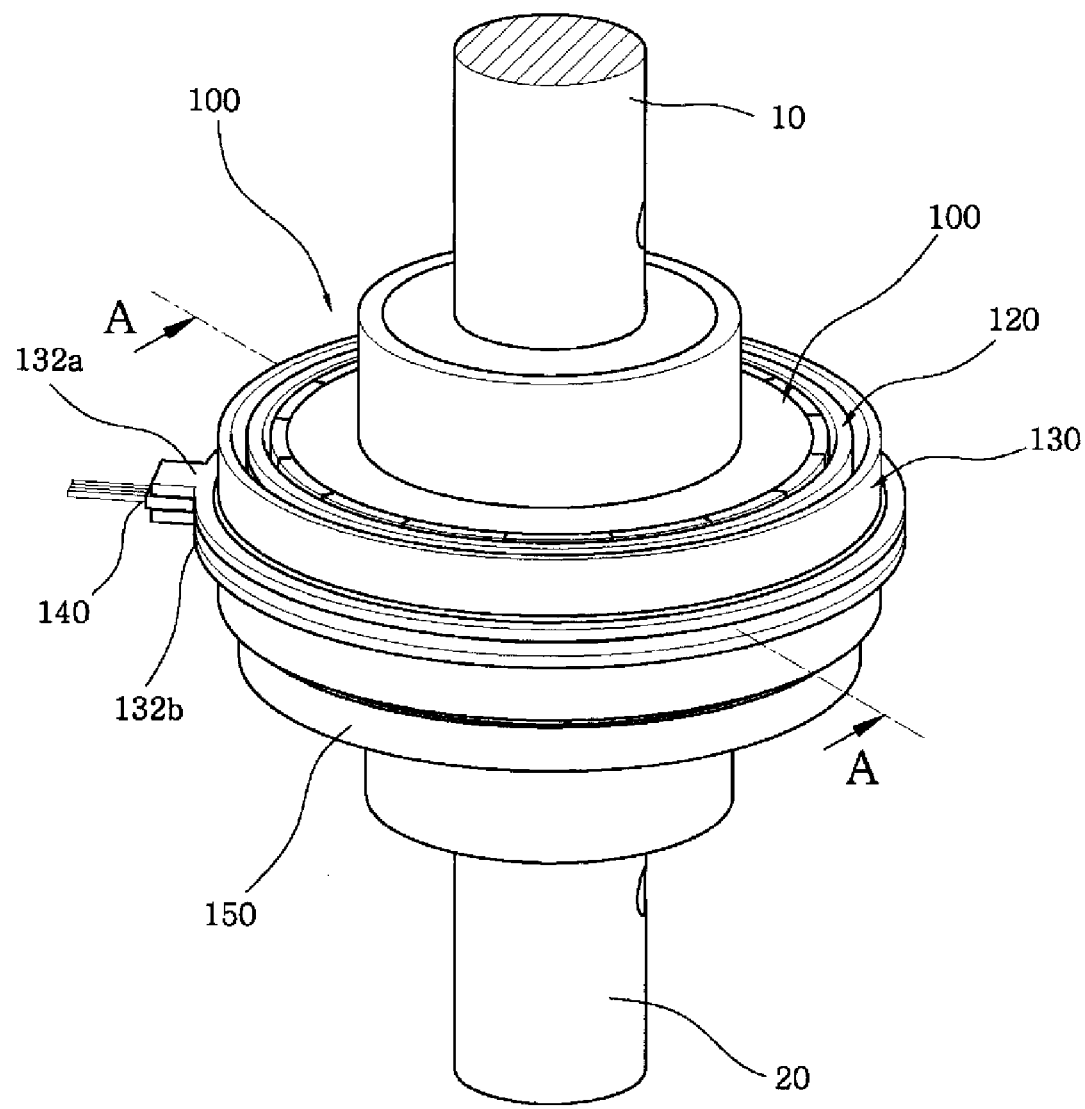
FIG. 1 is a perspective view of a contactless torque sensor for a steering system according to a first exemplary embodiment of the present invention.
Figure 2:
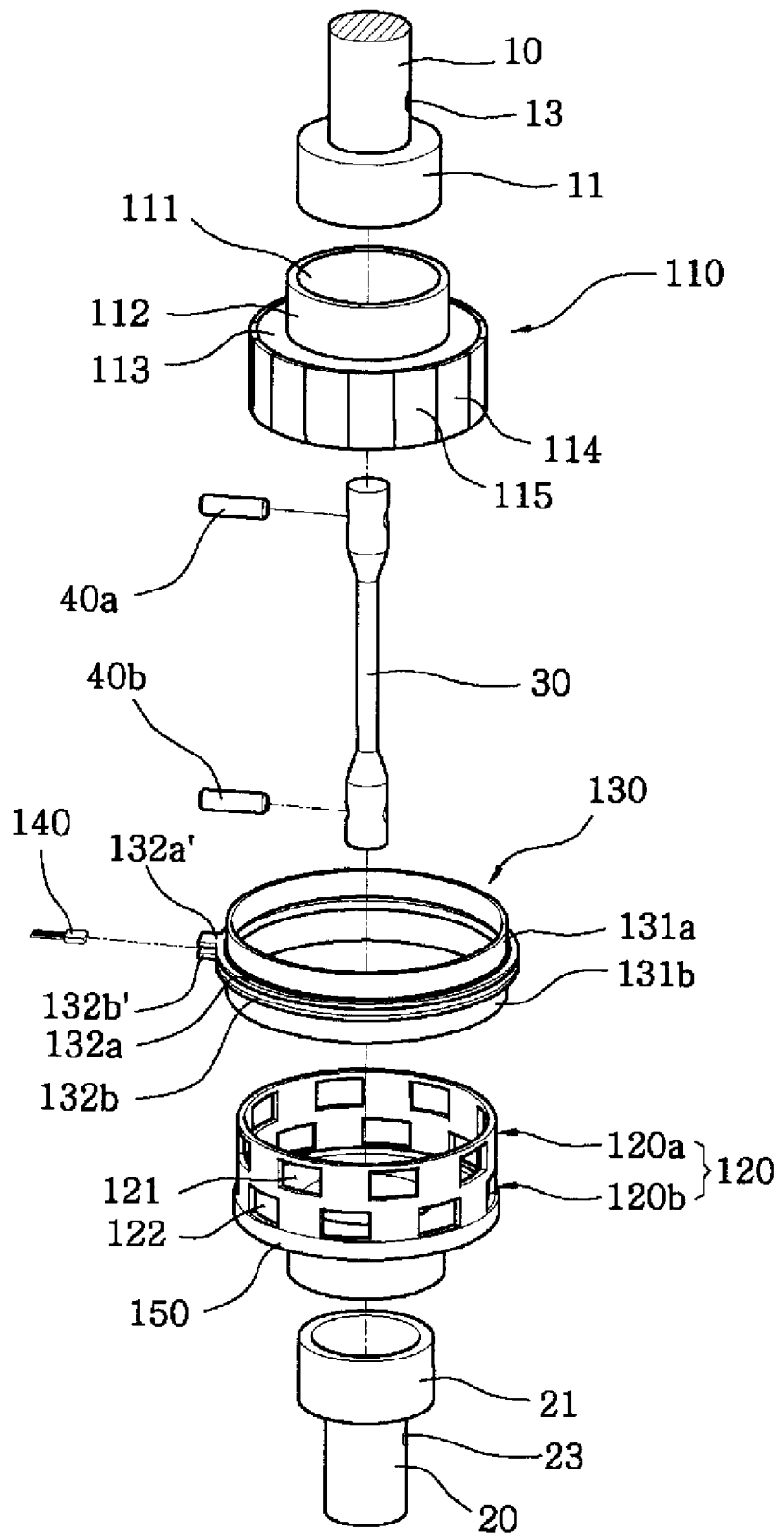
FIG. 2 is an exploded view of the contactless torque sensor for a steering system in FIG. 1.
Figure 3:
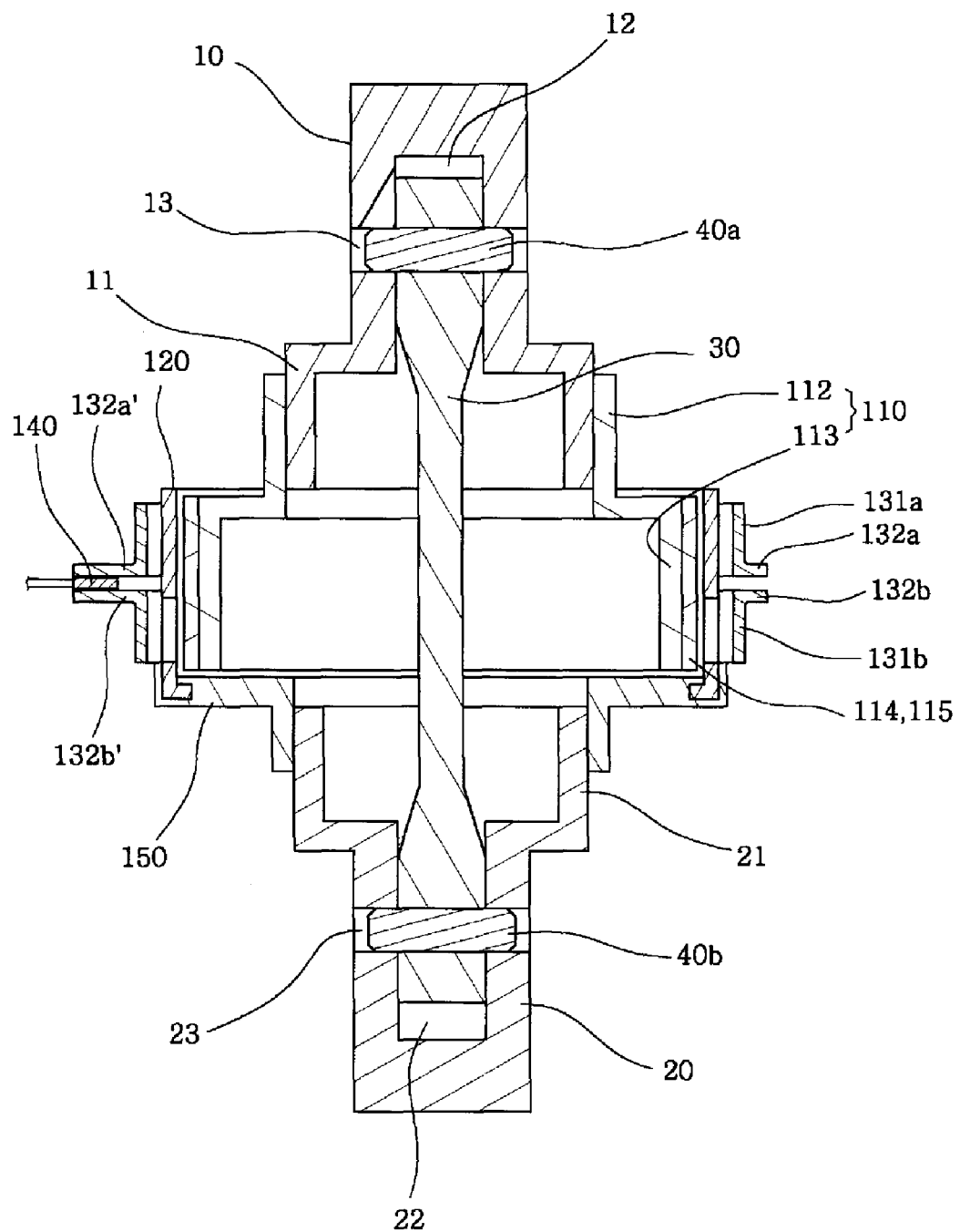
FIG. 3 is a sectional view along A-A line in FIG. 1.
Figure 4:
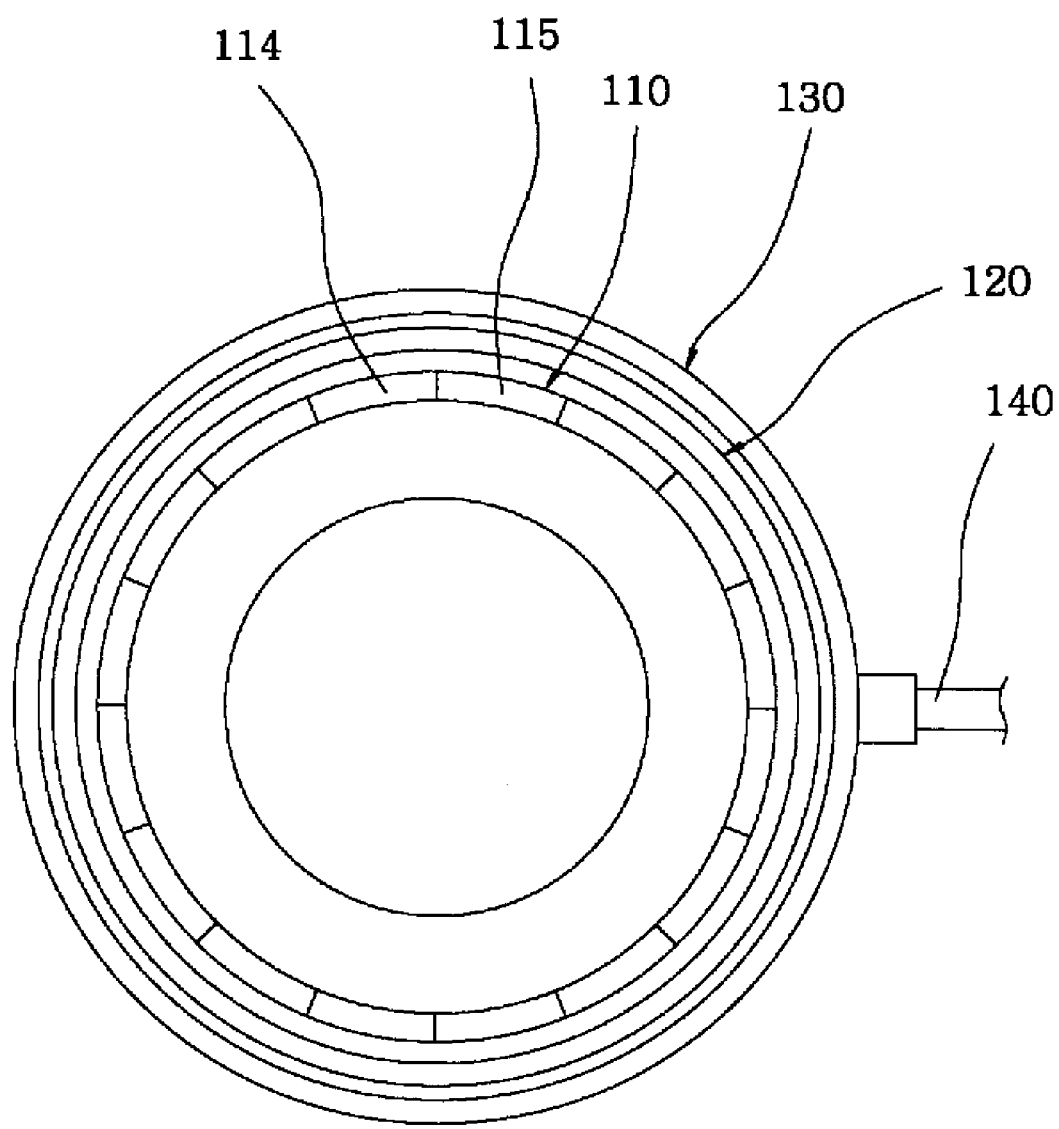
FIG. 4 is a plan view of the contactless torque sensor for a steering system in FIG. 1.

As shown in FIGS. 1 to 3, the contactless torque sensor 100 for a steering system according to the first exemplary embodiment of the present invention comprises a magnetic force generating part 110, a magnetic shield part 120, a magnetic detection part 130 and a magnetic detection sensor part 140.

The magnetic force generating part 110 is coupled to an input shaft 10 which is connected to a steering wheel of a vehicle, the magnetic shield part 120 is coupled to an output shaft 20 which is connected to a vehicle wheel, and the input shaft 10 and the output shaft 20 are connected together via a torsion bar 30.

In this embodiment, the input shaft 10 has at its bottom end an insert part 11, in which a connecting hollow 12 is formed to insert an upper end of the torsion bar 30. Also, a connecting hole 13 is formed to pass through an outer surface of the input shaft 10 at an upper side of the insert part 11.

In this case, a shape of the insert part 11 provided to the input shaft 10 may vary according to the shape of the magnetic force generating part 110.

That is, although, in the accompanied figures, the magnetic force generating part 110 is inserted by a bottom end part of the input shaft 10 and the connecting hollow 12 is inserted by an upper end part of the torsion bar 30 thus coupled together by a pin 40a, all these structures are described for explaining the exemplary embodiment of the present invention and the coupling method or state between the magnetic force generating part 110 and the input shaft 10 can be changed according to the shape of the magnetic force generating part 110.

The magnetic force generating part 110 comprises a coupling part 112 which has at its center a penetrating hole 111, a magnet attaching part 113, and a plurality of N pole magnets 114 and S pole magnets 115.

The penetrating hole 111 of the coupling part 112 is inserted by the insert part 11 provided at the bottom end part of the input shaft 10. In this case, the insert part 11 and the coupling part 112 can be coupled together through coupling means (not shown) or through coupling screws formed on an outer surface of the insert part 11 and an inner surface of the coupling part 112.

The magnet attaching part 113 is located at a lower side of the coupling part 112. The magnet attaching part 113 may be integrally formed with the coupling part 112. An inner side of the magnet attaching part 113 is formed as a cylinder shape with a uniform radius.

The N pole magnets 114 and the S pole magnets 115 are provided as a plural number respectively, disposed alternately on an outer surface of the magnet attaching part 113, and a sum of the N pole and the S pole magnets 114, 115 makes an even number.

That is, if the number of the N pole magnets 114 is eight, then the number of the S pole magnets 115 is eight. And, if the number of the N pole magnets 114 is nine, then the number of the S pole magnets 115 is nine.

Also, the N pole magnets 114 and the S pole magnets 115 may be originally provided as a separate one with each other to be attached on the outer surface of the magnet attaching part 113. Or, a ferromagnetic substance which originally has no polarity may be attached on the outer surface of the magnet attaching part 113 to be applied with polarities of N and S partitioned therebetween so that the N pole magnets 114 and the S pole magnets 115 can be constituted.

In the attached figures, the number of the N pole and the S pole magnets 114, 115 are provided as eight respectively. However, the number may vary. The N pole and the S pole magnets 114, 115 have the same thickness at all their areas.

The magnetic shield part 120 is disposed at an outer side of the magnetic force generating part 110 and has a first magnetic shield part 120a and a second magnetic shield part 120b. However, the first magnetic shield part 120a and the second magnetic shield part 120b are formed integrally to have a shape of a cylinder.

That is, the magnetic shield part 120 is located apart from the N pole and the S pole magnets 114, 115 at a distance therefrom. A lower end part of the magnetic shield part 120 is coupled to the output shaft 20 as will be described later. In the attached figures, an additional coupling member 150 is coupled to a lower end part of the magnetic shield part 120, and the output shaft 20 is coupled to the connecting member 150.

The magnetic shield part 120 has a plurality of holes 121 and 122, which are a plurality of first through holes 121 and a plurality of second through holes 122 and which are located in the areas of the N pole magnets 114 and the S pole magnets 115. Hereinafter, the plurality of the first through holes 121 are also called as the first through holes 121 and the plurality of the second through holes 122 are also called as the second through holes 122.

The first through holes 121 are located at an upper side of the magnetic shield part 120 and the second through holes 122 are located at a lower side of the magnetic shield part 120.

That is, the first through holes 121 are located on the surface of the first magnetic shield part 120*a* with a uniform interval therebetween, and the second through holes 122 are located on the surface of the second magnetic shield part 120*b* with the uniform interval therebetween.

In this case, the numbers of the first through holes 121 and the second through holes 122 are the same as those of the N pole magnets 114 and the S pole magnets 115. So, if the number of the N pole magnets 114 is eight, then the number of the first through holes 121 is eight.

Also, the first through holes 121 and the second through holes 122 are located to be contrary to each other.

That is, one second through hole 122 is formed between two neighboring first through holes 121.

Also, the first through holes 121 and the second through holes 122 have the same shape and area. In the attached figures, all of the first through holes 121 and the second through holes 122 have the same shape of a rectangle.

However, the first through holes 121 and the second through holes 122 may also have the same shape of "o", "□", " ", " ", " " or may have any other shape, for example, an oval, an elongated hole and a trapezoid.

In this case, the shapes described above should be formed symmetrically in a horizontal direction with their axis of symmetry at a center line of each area of the holes 121 and 122.

Also, the holes 121 and 122 may be prepared with 2 or more of the shapes described above, but the same uniform shape is preferable.

According to an embodiment, the magnetic shield part 120 may have the same height as the N pole and the S pole magnets 114, 115 and the magnetic detection part 130 to be described later.

That is, an upper height of the N pole and the S pole magnets 114, 115 and the upper height of the magnetic detection part 130 are the same as that of the first through holes 121 formed in the magnetic shield part 120. Also, a lower height of the N pole and the S pole magnets 114, 115 and the lower height of the magnetic detection part 130 are the same as that of the second through holes 122 formed in the magnetic shield part 120.

However, this heights condition is only exemplarily described. Thus, the upper height of the N pole and the S pole magnets 114, 115 and the upper height of the magnetic detection part 130 may be different from that of the first through holes 121, and the lower height of the N pole and the S pole magnets 114, 115 and the lower height of the magnetic detection part 130 may be different from that of the second through holes 122.

As described above, the lower part of the magnetic shield part 120 is coupled to the coupling member 150, whose center part is protruded downward to be inserted by the output shaft 20 to be coupled thereto.

The coupling member 150 and the output shaft 20 may be coupled together by coupling means (not shown).

The output shaft 20 has an insert part 21 at its upper end to be inserted into the coupling member 150. A connecting hollow 22 is formed at a center part of the insert part 21 to be inserted by the lower end part of the torsion bar 30. The output shaft 20 has a coupling hole 23 that passes through the connecting hollow 22. The torsion bar 30 and the output shaft 20 are coupled together by a pin 40*b* inserted into the coupling hole 23.

The magnetic detection part 130 is provided to be apart from the outer surface of the magnetic shield part 120 and performs detection of a magnetic force passing through the first and the second through holes 121, 122.

Such a magnetic detection part 130 comprises a first magnetic detection member 131*a* and a second magnetic detection member 131*b* both of which are made of a ferromagnetic substance with a ring shape.

The first magnetic detection member 131*a* leads to a first magnetic collecting ring 132*a* and the second magnetic detection member 131*b* leads to a second magnetic collecting ring 132*b*.

The first magnetic detection member 131*a* and the second magnetic detection member 131*b* are located apart from each other. A height of the upper end of the first magnetic detection member 131*a* and a height of the lower end of the second magnetic detection member 131*b* may be the same as those of the upper end of the N pole magnets 114 and the lower end of the S pole magnets 115, or may be smaller than those thereof.

For the latter case, that is, when smaller than the height of the N pole and the S pole magnets 114, 115, the upper end of the first magnetic detection member 131*a* should not protrude out of the upper end of the first through holes 121, and the lower end of the second magnetic detection member 131*b* should not protrude out of the lower end of the second through holes 122.

Therefore, the magnetic force passing through the first through holes 121 is detected by the first magnetic detection member 131*a* and the magnetic force passing through the second through holes 122 is detected by the second magnetic detection member 131*b*.

The first magnetic collecting ring 132*a* is coupled to an outer surface of the first magnetic detection member 131*a* and the second magnetic collecting ring 132*b* is coupled to an outer surface of the second magnetic detection member 131*b*. The first and the second magnetic collecting rings 132*a*, *b* are for maximizing the magnetic force, that is induced from the magnetic force generating part 110, near to surroundings of the magnetic detection sensor part 140.

The first magnetic collecting ring 132*a* has a first protruding part 132*a*' at its outer surface to protrude outwardly, and the second magnetic collecting ring 132*b* has a second protruding part 132*b*' at its outer surface to protrude outwardly and to be overlapped with the first protruding part 132*a*' in a vertical direction.

Such a first and a second protruding parts 132*a*' and 132*b*' may be prepared as a plural number respectively at the same position in the vertical direction.

The magnetic detection sensor part 140 is located at an outer side of the magnetic detection part 130 to detect a relative twist according to a change of area over which the magnetic force generating part 110 and the magnetic shield part 120 face with each other.

Although, only one magnetic detection sensor part 140 is shown in the accompanying figures, the number of the magnetic detection sensor part 140 varies according to the number of the first and the second protruding parts 132*a*', 132*b*'.

That is, because the magnetic detection sensor part 140 is installed between the first protruding part 132*a*' and the second protruding part 132*b*', the number of the magnetic detection sensor part 140 depends on the number of the first and the second protruding parts 132*a*', 132*b*'.

As the magnetic detection sensor part 140 mentioned above to detect the magnetic force is a kind of a sensor widely used in a mechanical industry, a detailed description thereof is omitted in this specification.

Hereinafter, an operation of the contactless torque sensor 100 for a steering system according to the first exemplary embodiment of the present invention will be described.

Figure 5:
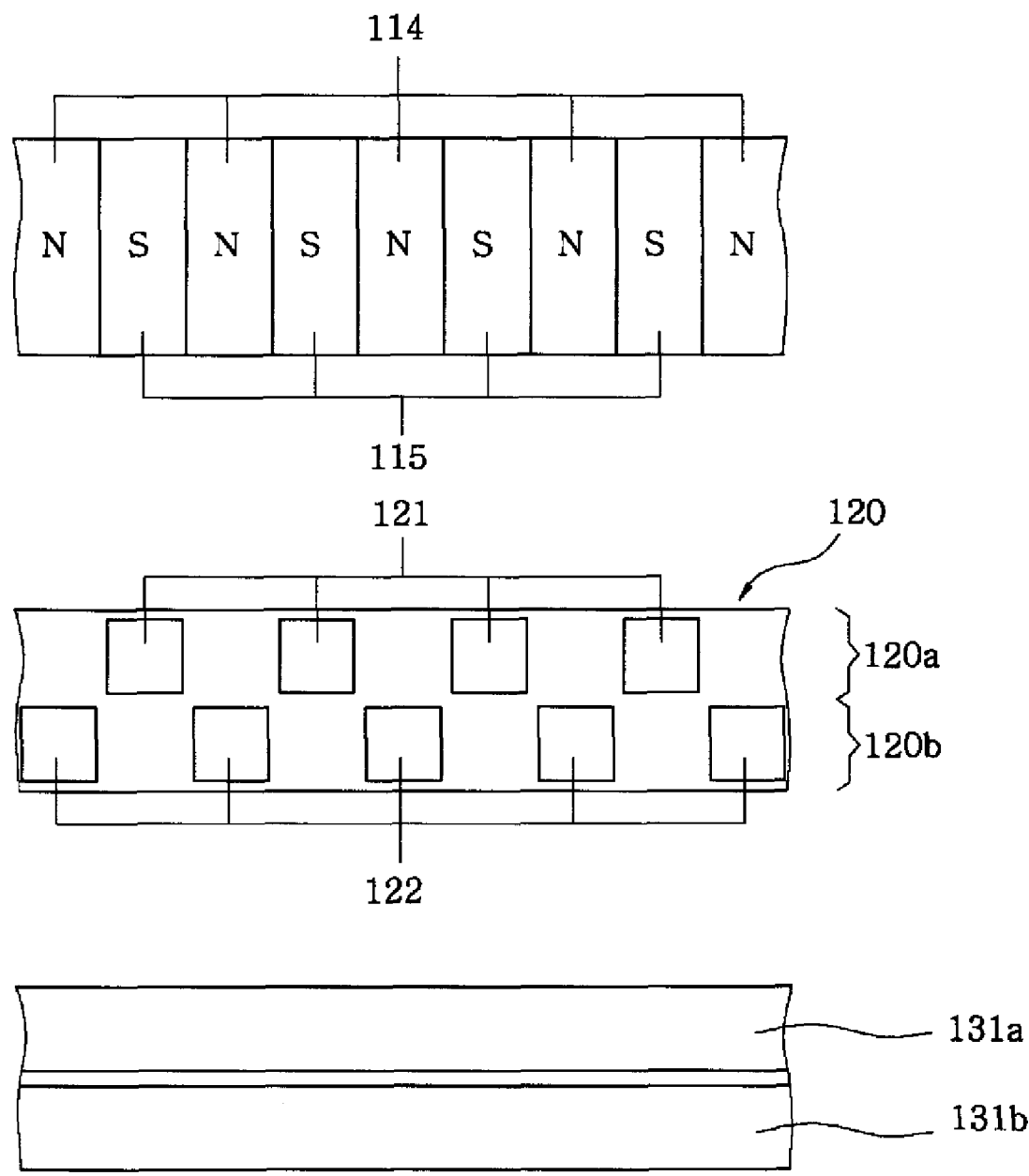
FIG. 5 is a 2-dimensional development view of the contactless torque sensor for a steering system in FIG. 1.
Figure 6:
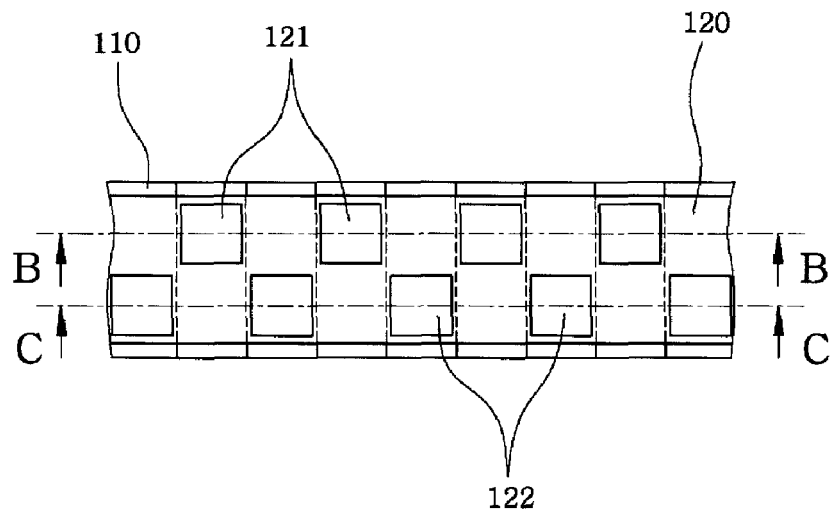
FIG. 6 is a overlapped development view of the contactless torque sensor for a steering system in FIG. 5.
Figure 7:
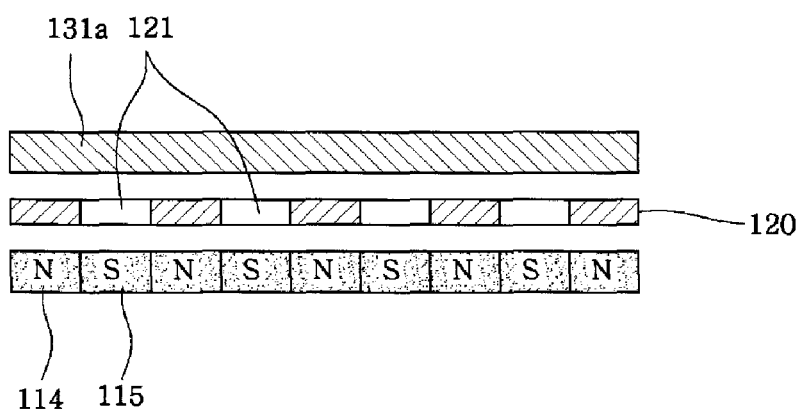
FIG. 7 is a sectional view along B-B line in FIG. 6.
Figure 8:
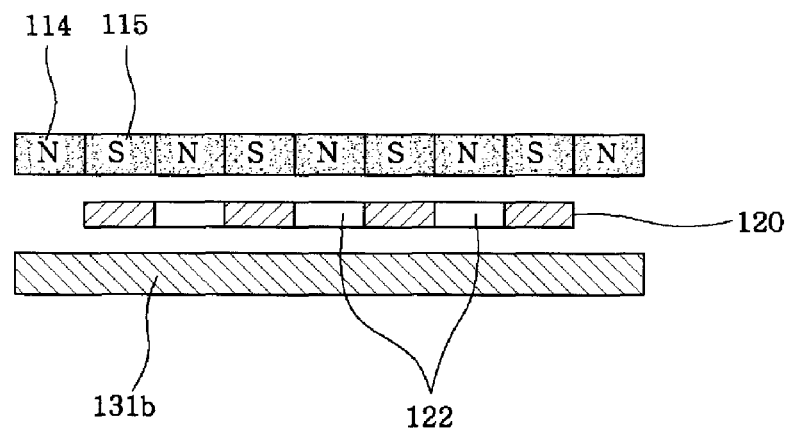
FIG. 8 is a sectional view along C-C line in FIG. 6.

FIG. 5 is a 2-dimensional development view of the contactless torque sensor 100 that represents the torque sensor 100 of a circular shape in a 2-dimension plane to explain an operation and a detection theory of the contactless torque sensor 100 for a steering system according to the first exemplary embodiment of the present invention. FIG. 6 is an overlapped development view of the contactless torque sensor for a steering system in FIG. 5, FIG. 7 is a sectional view along B-B line in FIG. 6, and FIG. 8 is a sectional view along C-C line in FIG. 6.

As seen in FIGS. 5 to 8, the magnetic shield part 120 is located within the area of the magnetic force generating part 110. The first magnetic detection member 131a provided in the magnetic detection part 130 is located within the area of the first through holes 121, and the second magnetic detection member 131b provided in the magnetic detection part 130 is located within the area of the second through holes 122.

Also, a horizontal width of each first through hole 121 is located within the width of the N pole magnet 114 and the horizontal width of each second through hole 122 is located within the width of the S pole magnet 115.

The horizontal width of the first through hole 121 may be located within the width of the S pole magnet 115. In this case, the horizontal width of the second through hole 122 is located within the width of the N pole magnet 114.

Figure 9:
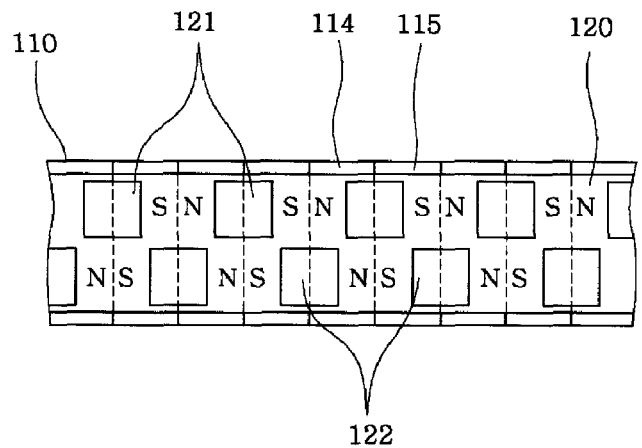
FIG. 9 is a 2-dimensional development view showing a neutral state of the contactless torque sensor for a steering system according to the first exemplary embodiment of the present invention.

FIG. 9 is a 2-dimensional development view showing a neutral state of the contactless torque sensor 100, where there isn't a twist between the input shaft 10 and the output shaft 20.

FIG. 9 represents a state where the steering wheel and the vehicle wheel rotate with the same amount of angle or a state where the twist of the input shaft 10 and the output shaft 20 is zero with the vehicle standing still.

More specifically, if the driver operates the steering wheel, the input shaft 10 connected to the steering wheel rotates. And, the output shaft 20 rotates through the torsion bar 30 thus changing the direction of the vehicle wheel.

When the twist angle is zero due to the same rotation between the input shaft 10 and the output shaft 20, boundary parts between the N pole magnets 114 and the S pole magnets 115 are located at the centers of the first through holes 121 and the second through holes 122.

Accordingly, the N pole magnets 114 and the S pole magnets 115 provided in the magnetic force generating part 110 are exposed to the first through holes 121 and the second through holes 122 with exactly the same amount of area therebetween.

Therefore, the magnetic force of two polarity received in the magnetic detection part 130 is counterbalanced to zero polarity.

More specifically, each of the first through holes 121 and the second through holes 122 passes the N pole magnetic force over its 50% area and the S pole magnetic force over the rest 50% area. Therefore, the polarity having passed through per hole and being detected at the magnetic detection part 130 becomes zero.

Figure 10:
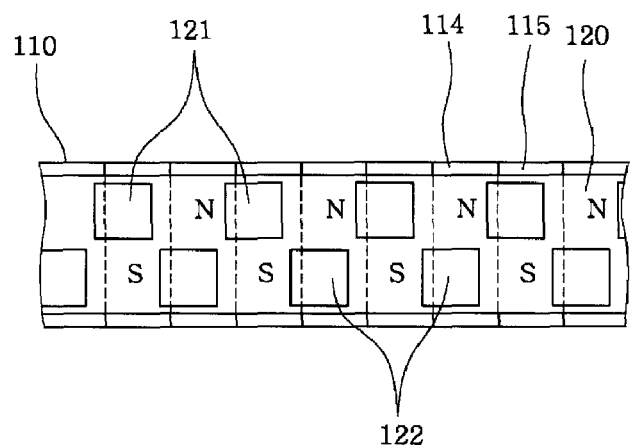
FIG. 10 is a 2-dimensional development view showing a twisted state of the contactless torque sensor for a steering system according to the first exemplary embodiment of the present invention where an output shaft is twisted in the left direction.
Figure 11:
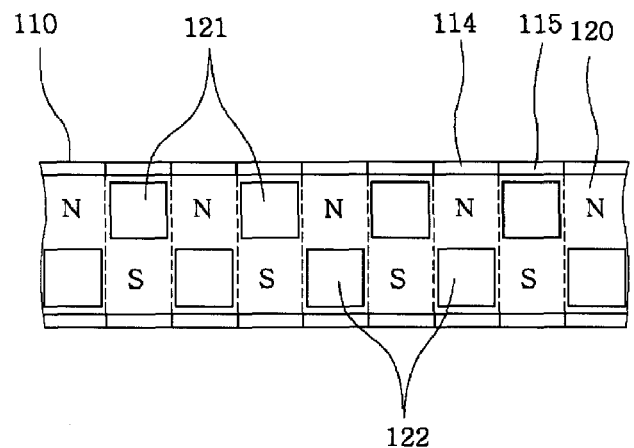
FIG. 11 is a 2-dimensional development view showing a twisted state of the contactless torque sensor for a steering system according to the first exemplary embodiment of the present invention where the output shaft is twisted to its maximum in the left direction.

FIG. 10 is a 2-dimensional development view showing a twisted state where the output shaft 20 is twisted in the left direction relative to the input shaft 10 and FIG. 11 is a 2-dimensional development view where the output shaft 20 is twisted to its maximum in the left direction relative to the input shaft 10.

A state of the twist being generated in the left direction as shown in FIGS. 10 and 11 represents that there is a twist between the input shaft 10 and the output shaft 20 due to a friction between the vehicle wheel and a road surface when the driver rotates the steering wheel in the left direction.

That is, the state is that there is a twist generated in the torsion bar 30 which connects the input shaft 10 and the output shaft 20. If the twist increases gradually, the S pole magnet 115 increases its exposure area within each first through hole 121. And, as the exposure area of the S pole magnet 115 increases, that of the N pole magnet 114 decreases.

Likewise, the N pole magnet 114 increases its exposure area within each second through hole 122. And, as the exposure area of the N pole magnet 114 increases, that of the S pole magnet 115 decreases.

Accordingly, there arises a difference in the first magnetic detection member 131a provided in the magnetic detection part 130 between the magnetic forces induced by the N pole magnet 114 and the S pole magnet 115. Therefore, the first magnetic detection member 131a has its polarity of N.

Likewise, the second magnetic detection member 131b has its polarity of S, which shows exactly the opposite but the same amount of magnetic force compared to that induced in the first magnetic detection member 131a.

As seen in FIG. 11, when the twist in the left direction reaches its maximum, the first magnetic detection member 131a has the polarity of N only and the second magnetic detection member 131b has the polarity of S only.

The polarity of N firstly induced in the first magnetic detection member 131a is also induced in the upper end of the magnet detection sensor part 140 through the first magnetic collecting ring 132a. Also, the polarity of S firstly induced in the second magnetic detection member 131b is also induced in the lower end of the magnet detection sensor part 140 through the second magnetic collecting ring 132b.

Then, a magnetic field is formed around the magnetic detection sensor part 140 and a magnetic flux at this time is detected by the magnetic detection sensor 140.

As described above, the twist between the input shaft 10 and the output shaft 20 increases linearly from the start of the twist to the maximum thereof.

At the same time, the areas by which the magnetic force generating part 110 faces the magnetic detection part 130 through the first and the second through holes 121, 122 formed in the magnetic shield part 120 are changed linearly, so that the magnetic flux formed around the magnetic detection sensor part 140 can also be changed linearly.

The above description is for the case where the twist of the output shaft 20 relative to the input shaft 10 is in the left direction.

However, as the polarity will be changed according to a change in a disposition of the N pole and the S pole magnets 114, 116, the twist in the left direction in the above description may be equally applicable to the twist in the right direction.

That is, as the twist in the left direction described above is based on a specific direction in the corresponding figures, the above description may be applicable to the twist in the right direction.

Figure 12:
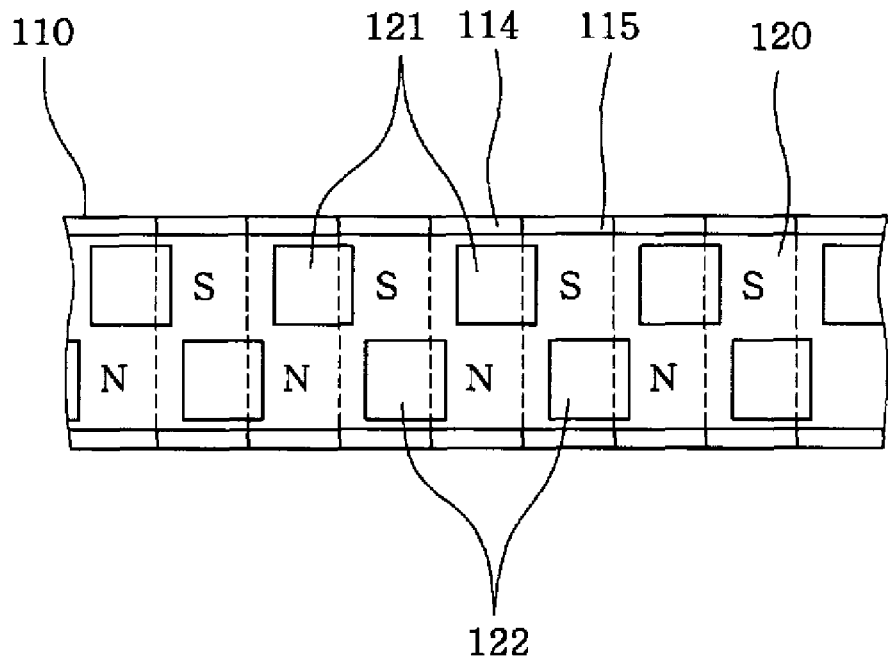
FIG. 12 is a 2-dimensional development view showing a twisted state of the contactless torque sensor for a steering system according to the first exemplary embodiment of the present invention where an output shaft is twisted in the right direction.
Figure 13:
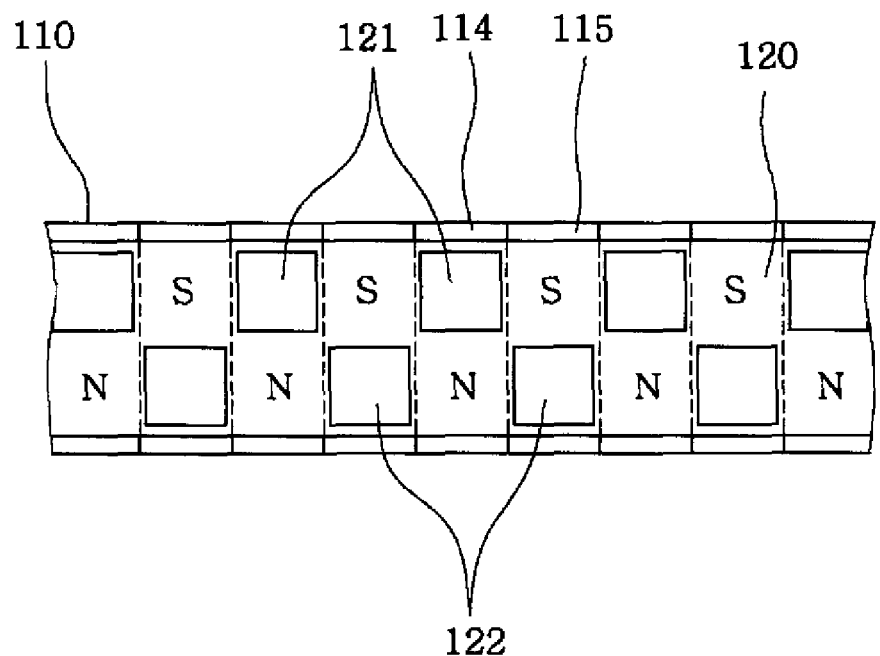
FIG. 13 is a 2-dimensional development view showing a twisted state of the contactless torque sensor for a steering system according to the first exemplary embodiment of the present invention where the output shaft is twisted to its maximum in the right direction.

When there is a twist in the right direction in opposition to the above description, the polarity of the magnetic field that is formed around the magnetic detection sensor part 140 is changed into the opposite value having a phase shift of 180 degrees, which is described in FIGS. 12 and 13. The detailed description regarding theses figures is omitted in this specification.

FIG. 12 is a 2-dimensional development view showing a twisted state where the output shaft 20 is twisted in the right direction with regard to the input shaft 10, and FIG. 13 is a 2-dimensional development view showing a twisted state where the output shaft 20 is twisted to its maximum in the right direction with regard to the input shaft 10.

Figure 14:
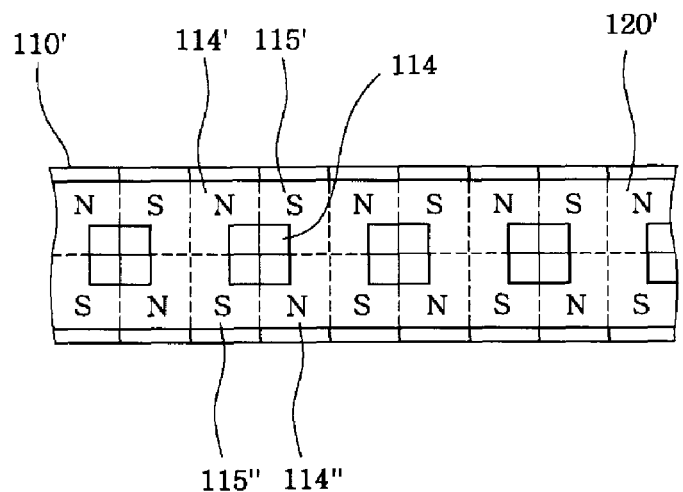
FIG. 14 is a 2-dimensional development view showing a neutral state of modified embodiments of a magnetic force generating part and a magnetic shield part which are provided in the contactless torque sensor for a steering system according to the first exemplary embodiment of the present invention.

However, as shown in FIG. 14, the contactless torque sensor for a steering system according to the first exemplary embodiment of the present invention may have a magnetic force generating part 110' where N pole magnets 114' and S pole magnets 115' are disposed in turn along the outer surface of the upper part of the magnet attaching part and where another S pole magnets 115'' are disposed under the N pole magnets 114' and another N pole magnets 114'' are disposed under the S pole magnets 115'.

In this case, a magnetic shield part 120' has a through hole 121' at a common boundary area of the magnets 114', 114'', 115' and 115''. The same through hole 121' is formed at every such a boundary area.

Accordingly, when there is a twist in the left direction, at every through hole 121' (refer to FIG. 14), the exposed surfaces of the upper right S pole magnet 115' and the lower right N pole magnet 114'' are increased.

On the contrary, the exposed surfaces of the upper left N pole magnet 114' and the lower left S pole magnet 115'' are decreased at the same time.

Therefore, there is a difference generated in the magnetic forces which are induced at the first magnetic detection member 131a and the second magnetic detection member 131b through the through holes 121', so that the magnetic detection sensor part 140 can detect the difference.

Figure 15:
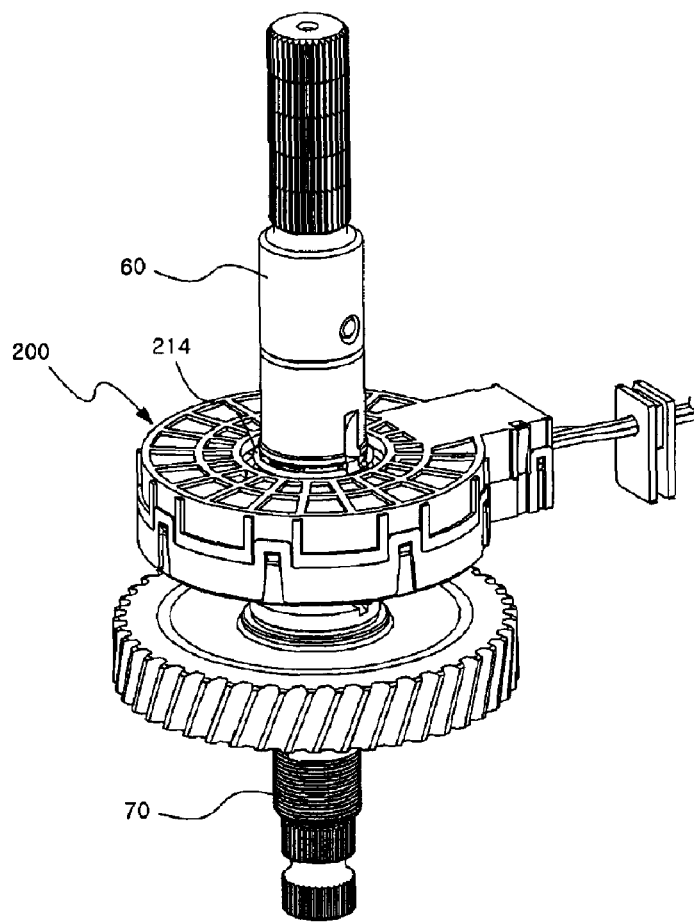
FIG. 15 is a perspective view showing an installed state of a contactless torque sensor for a steering system according to a second exemplary embodiment of the present invention.

A contactless torque sensor 200 for a steering system according to a second exemplary embodiment of the present invention is, as shown in FIG. 15, provided between an input shaft 60 corresponding to a steering wheel shaft of a vehicle and an output shaft 70 connected directly to a driving shaft of a vehicle wheel to perform measuring a twist angle between the input shaft 60 and the output shaft 70.

Figure 16:
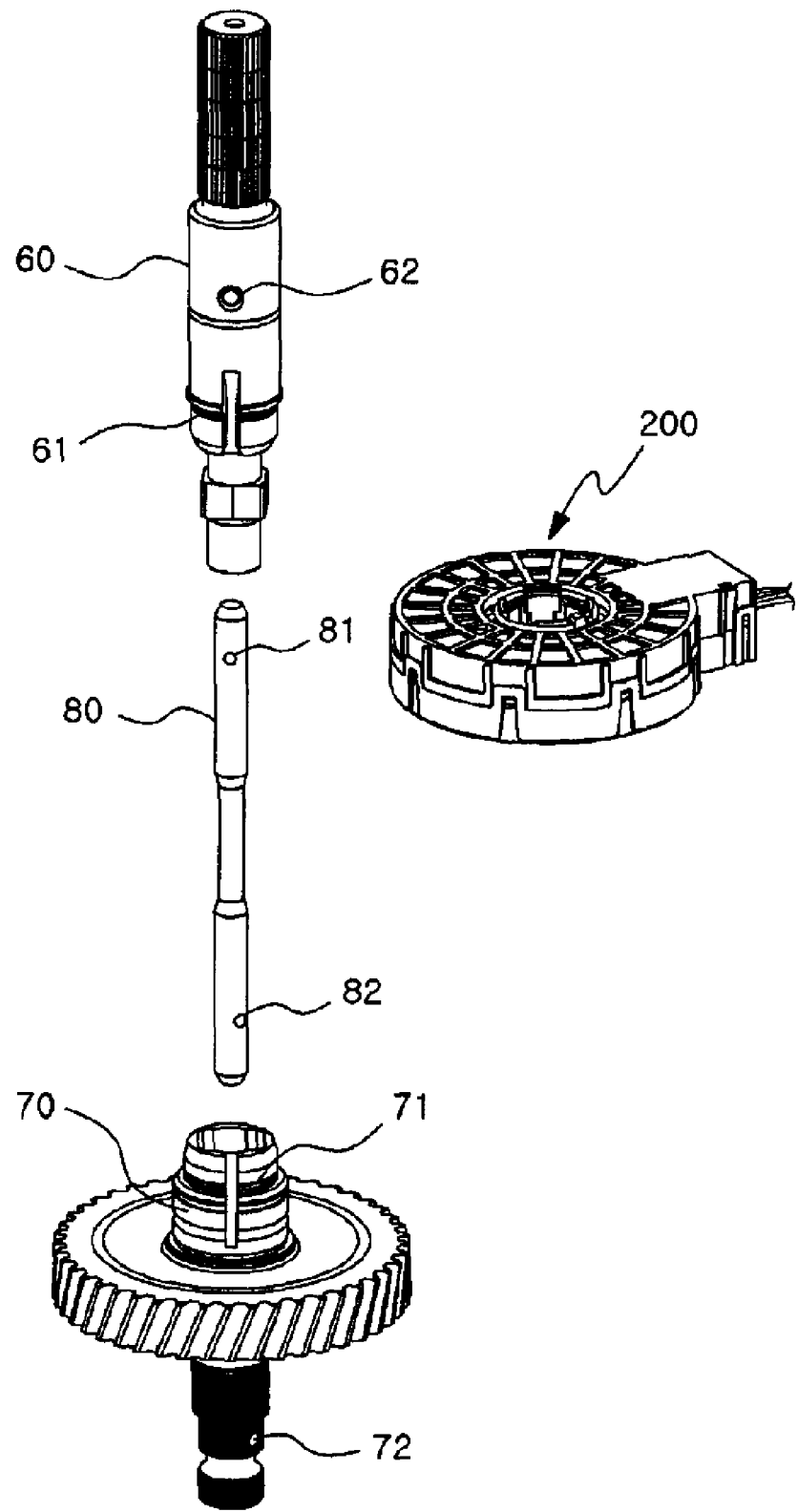
FIG. 16 is an exploded view of the installed state of the contactless torque sensor for a steering system in FIG. 15.

The input shaft 60 and the output shaft 70 are not directly connected to each other but connected via a torsion bar 80 as shown in FIG. 16.

That is, the torsion bar 80 has an upper end part to be inserted into the input shaft 60. When a hole 81 corresponds to a coupling hole 62 of the input shaft 60, a coupling pin (not shown) is inserted to couple the torsion bar 80 with the input shaft 60.

Also, the torsion bar 80 has a lower end part to be inserted into the output shaft 70. When a hole 82 corresponds to a coupling hole 72 of the output shaft 70, a coupling pin (not shown) is inserted to couple the torsion bar 80 with the output shaft 70.

The torque sensor 200 is inserted by the torsion bar 80 and connected to the input shaft 60 and the output shaft 70 respectively.

Figure 17:
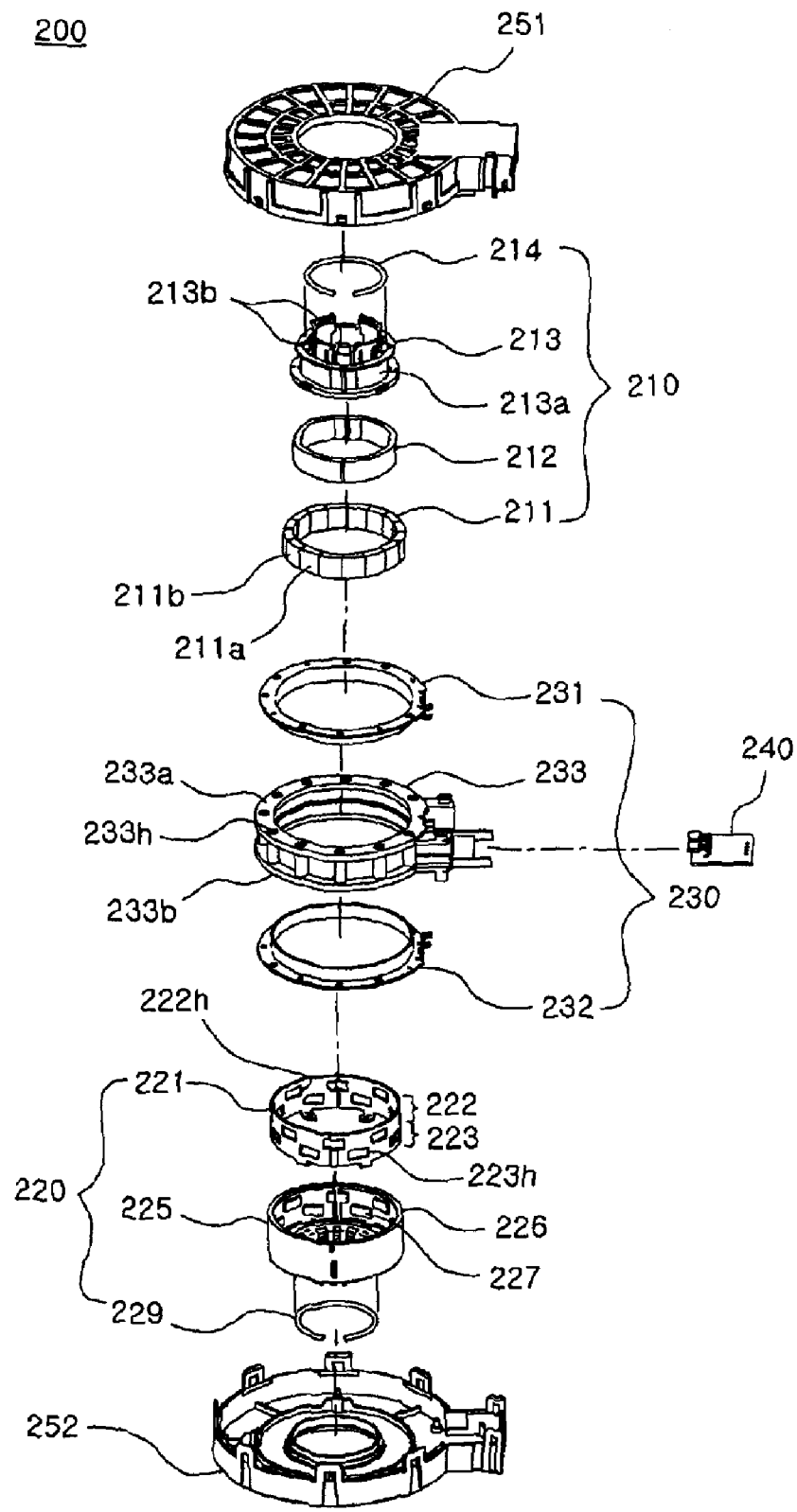
FIG. 17 is a perspective view of the contactless torque sensor for a steering system according to the second exemplary embodiment of the present invention.

As shown in FIG. 17, the torque sensor 200 comprises a magnetic force generating part 210 coupled to the input shaft 60, a magnetic shield part 220 provided at an outer side of the magnetic force generating part 210 and coupled to the output shaft 70, a magnetic detection part 230 provided to be stationary at an outer side of the magnetic shield part 220, a magnetic detection sensor part 240 having a predetermined positional relation with the magnetic detection part 230, and upper and lower cover 251, 252.

The magnetic force generating part 210 has a magnet ring 211 where N pole magnets 211a and S pole magnets 211b are disposed alternately in a circular direction to neighbor with each other.

The magnet ring 211 is attached onto an outer surface of a back yoke 212 which is of a ring shape and made of magnetic substance.

An inner surface of the back yoke 212 is fixedly attached to a receiving part 213a of a magnet holder 213.

The back yoke 212 may be made of steel and helps a magnetic flux generated from the magnet ring 211 to be more concentrated in an outer direction as will be described later.

The magnet holder 213 is made of non-magnetic substance such as plastic and has at its outer surface the receiving part 213a to receive and fix the magnet ring 211.

Also, the magnet holder 213 has at an upper side of the receiving part 213a a plurality of first coupling pieces 213b to be extended axially and separated in a circular direction with each other.

The input shaft 60 is inserted into an inner side of the first coupling pieces 213b.

For coupling the input shaft 60, each first coupling piece 213b has at its upper end and on an inner side a holding end (refer to 213c in FIGS. 18 and 19), which is inserted into a groove 61 of the input shaft 60.

When a plurality of the first coupling pieces 213b are combined to the input shaft 60, a first snap ring 214 is added on their outer side to prevent each coupling piece 213b from being bent outwardly.

Figure 18:
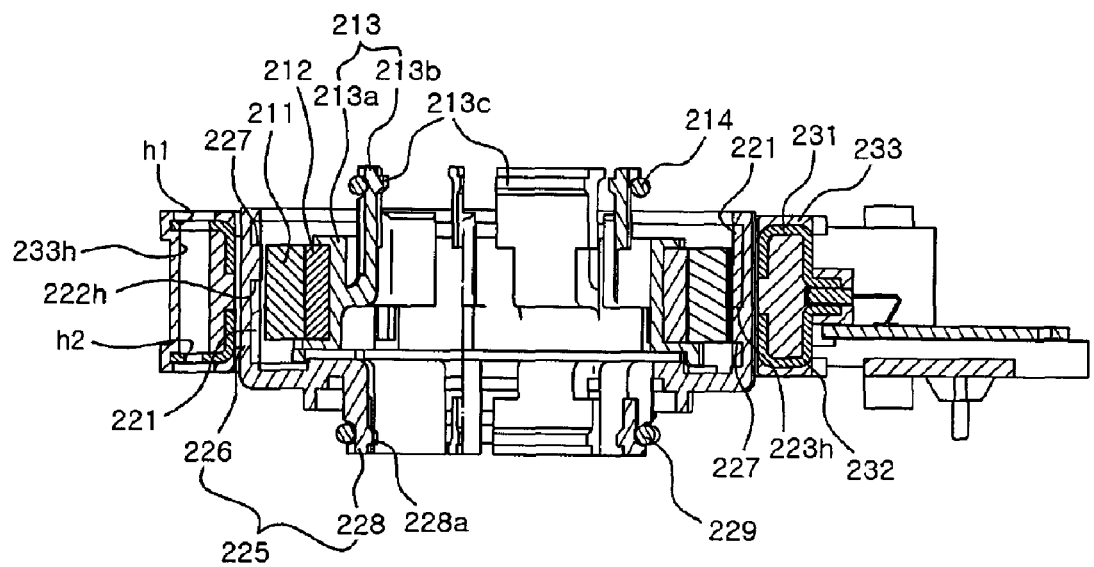
FIG. 18 is a sectional view of the contactless torque sensor for a steering system according to the second exemplary embodiment of the present invention.
Figure 19:
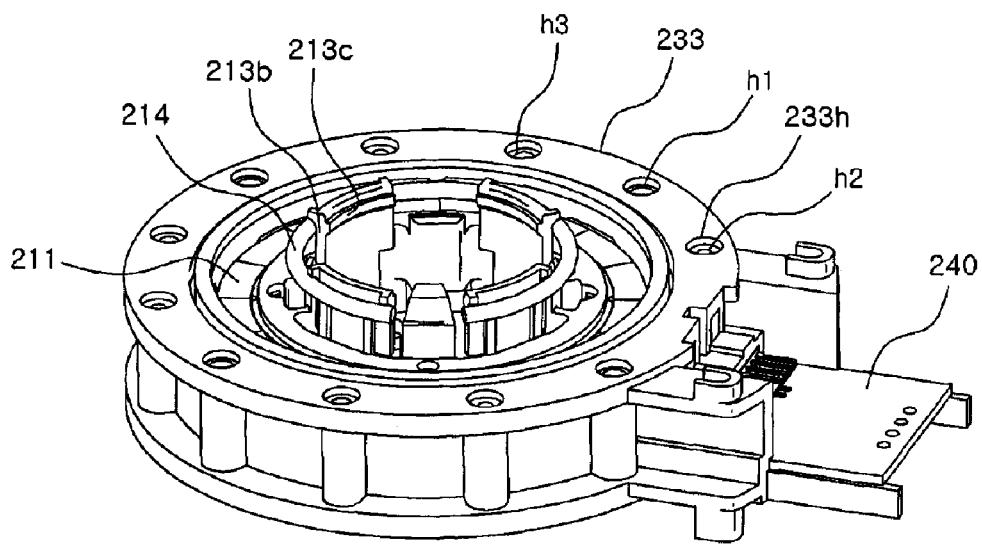
FIG. 19 is a perspective view of the contactless torque sensor for a steering system according to the second exemplary embodiment of the present invention.

A view of the first snap ring 214 inserted can be seen in FIGS. 15, 18 and 19.

The magnetic shield part 220 has a magnetic shield ring 221 and a shield ring holder 225.

The magnetic shield ring 221 is a cylinder that is made of magnetic substance and is divided into an upper shield surface 222 and a lower shield surface 223.

The upper and the lower shield surfaces 222, 223 have a number of through holes 222h and 223h which are disposed at a predetermined interval therebetween in a circular direction respectively. Also, the upper and the lower shield surfaces 222, 223 are located to be contrary, that is zigzag, between the upper shield surfaces 222 and the lower shield surfaces 223.

Figure 23:
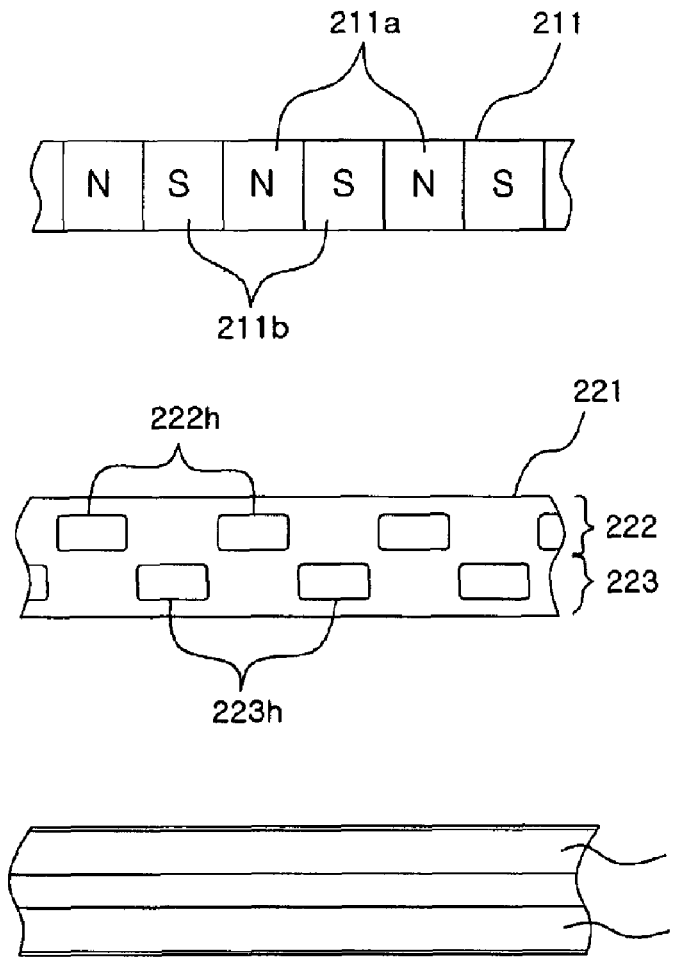
FIG. 23 is a schematic exploded view for explaining a relation among principal elements of the contactless torque sensor for a steering system according to the second exemplary embodiment of the present invention.

More specifically, each through hole 222h, 223h has its horizontal width to be sized within one magnet 211a or 211b comprised in the magnet ring 211 that will be located at the inner side of the through holes 222h and 223h (refer to FIG. 23).

Also, on each shield surface 222 and 223, there is an interval corresponding to a horizontal width of one magnet 211a or 211b between horizontally neighboring through holes 222h.

Accordingly, for example, if any one of the upper through holes 222h is located to correspond to the N pole magnet 211a at the inner side, every upper through hole 222h is located to correspond to the N pole magnet 211a at its inner side. In this case, all lower through holes 223h correspond to the S pole magnets 211b respectively.

The shield ring holder 225 of non-magnetic substance has a holding part 226 of a cylinder shape and second coupling pieces (refer to 228 in FIG. 18) formed at a lower side of the holding part 226 to be coupled to the output shaft 70.

The holding part 226 accommodates and supports the magnetic shield ring 221 at its inner side. Especially, a number of connecting protrusions 227 are formed on the inner side of the holding part 226 so that they correspond to the upper through holes 222h and the lower through holes 223h, which are inserted by the connecting protrusions 227 correspondingly when the magnetic shield ring 221 is coupled to the holding part 226.

Also, the shield ring holder 225 has at a lower side of the holding part 226 a plurality of second coupling pieces 228 to be extended axially and separated in a circular direction with each other (refer to FIG. 18). Formation and function of the second coupling pieces 228 are similar to those of the first coupling pieces 213b.

The output shaft 70 is inserted into an inner side of the second coupling pieces 228.

For coupling the output shaft 70, each second coupling piece 228 has at its lower end and on an inner side a holding end 228a, which is inserted into a groove (refer to 71 in FIG. 16) of the output shaft 70.

When a plurality of the second coupling pieces 228 are combined to the output shaft 70, a second snap ring 229 is added on their outer side to prevent each coupling piece 228 from being separated from the output shaft 70.

The magnetic shield ring 221 and the shield ring holder 225 can be coupled together by insert molding where the magnetic shield ring 221 is inserted into a mold and formed integrally with engineering plastic. The integral formation after the injection molding can be shown in FIG. 18.

The magnetic detection part 230, as shown in FIG. 17, comprises an upper magnetic collecting member 231 and a lower magnetic collecting member 232 both of which are made of magnetic substance, and a magnetic collecting member holder 233 which is made of non-magnetic substance and supports the upper and the lower magnetic collecting members 231, 232 to maintain a predetermined distance between them.

Although the upper and the lower magnetic collecting members 231, 232 seem to exist independently then combined together, they are actually buried in the magnetic collecting member holder 233.

Therefore, the upper and the lower magnetic collecting members 231 and 232 are integrally formed with the magnetic collecting member holder 233 by injection molding.

Figure 21:
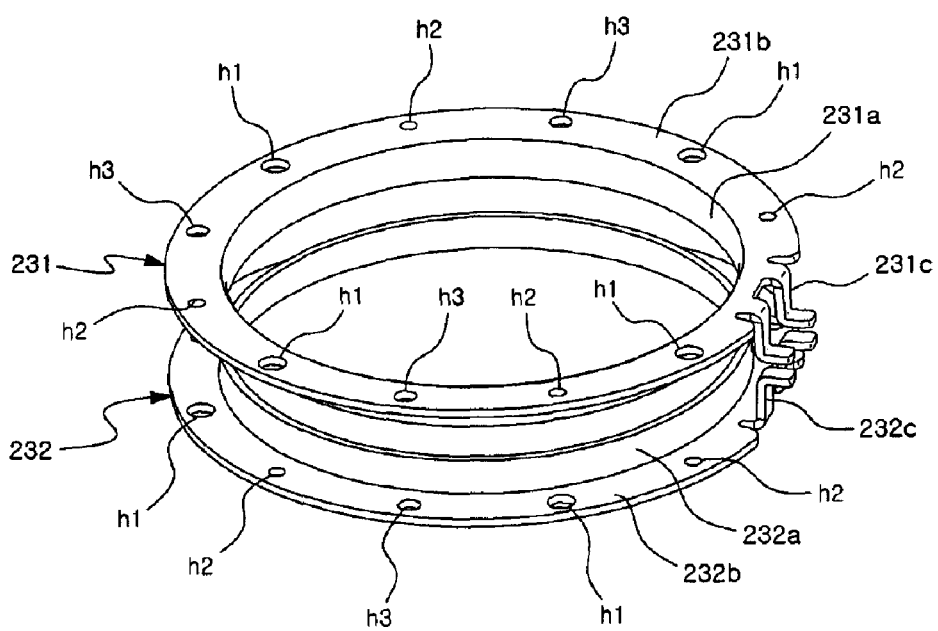
FIG. 21 is a expanded perspective view of a principal part of the contactless torque sensor for a steering system according to the second exemplary embodiment of the present invention.
Figure 22:
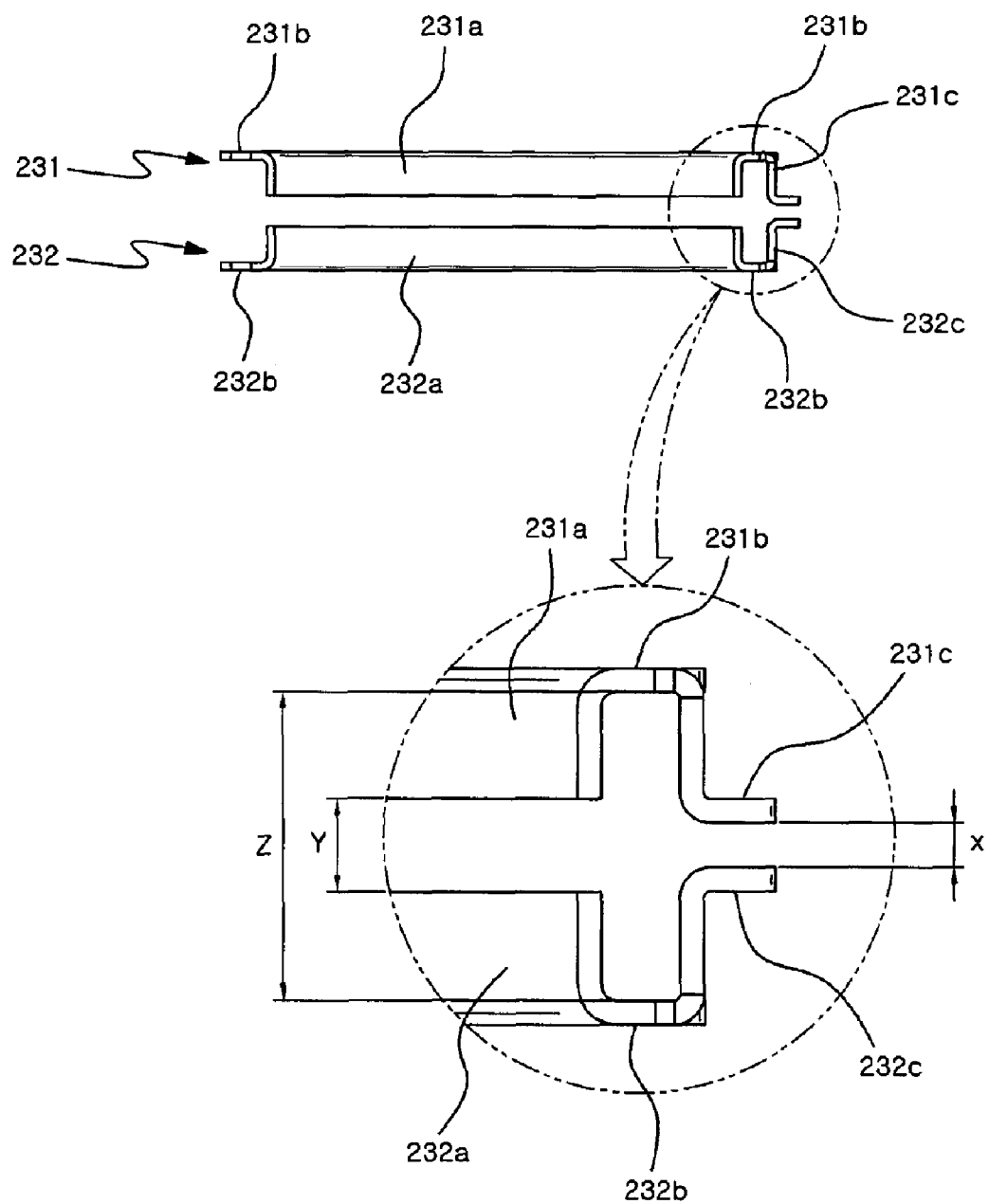
FIG. 22 is a sectional view of the principal part of the contactless torque sensor for a steering system in FIG. 21.

FIGS. 21 and 22 are a perspective view and a lateral view to describe a positional relation between the upper magnetic collecting member 231 and the lower magnetic collecting member 232.

As shown in the figures, the upper magnetic collecting member 231 has an upper magnetic flux collecting ring 231a having a cylinder shape with a small vertical width, an upper magnetic flux collecting flange 231b extending outwardly with a predetermined width at an upper end of the upper magnetic flux collecting ring 231a, and an upper magnetic collecting terminal 231c protruding downwardly from a right end part of the upper magnetic flux collecting flange 231b.

The lower magnetic collecting member 232 is provided to be vertically symmetrical with the upper magnetic collecting member 231.

That is, the lower magnetic collecting member 232 has a lower magnetic flux collecting ring 232a having a cylinder shape with a small vertical width, a lower magnetic flux collecting flange 232b extending outwardly with a predetermined width at a lower end of the lower magnetic flux collecting ring 232a, and a lower magnetic collecting terminal 232c protruding upwardly from a right end part of the lower magnetic flux collecting flange 232b.

Such upper and lower magnetic collecting members 231 and 232 are disposed above and below and disposed at an outer side of the magnetic shield ring 221 with a predetermined gap therebetween.

In this case, the upper magnetic flux collecting ring 231a of the upper magnetic collecting member 231 is located to face the upper shield surface 222 of the magnetic shield ring 221 and performs collecting a magnetic flux which is generated from the magnet ring 211 and exits through the through holes 222h of the upper shield surface 222.

The magnetic flux collected as described above is transmitted to the upper magnetic collecting flange 231b which is located at the upper end circumference of the upper magnetic flux collecting ring 231a, and then concentrated to the upper magnetic collecting terminal 231c which is located at the right end part of the upper magnetic collecting flange 231b.

Likewise, the lower magnetic flux collecting ring 232a of the lower magnetic collecting member 232 is located to face the lower shield surface 223 of the magnetic shield ring 221 and performs collecting the magnetic flux which is generated from the magnet ring 211 and exits through the through holes 223h of the lower shield surface 223.

The magnetic flux collected as described above is transmitted to the lower magnetic collecting flange 232b which is located at the lower end circumference of the lower magnetic flux collecting ring 232a, and then concentrated to the lower magnetic collecting terminal 232c which is located at the right end part of the lower magnetic collecting flange 232b.

Therefore, the magnetic detection part 230 performs concentrating the magnetic flux as described above to a spot.

To this end, as shown in FIG. 22, a distance Y between the upper and lower magnetic flux collecting rings 231a, 232a and a distance Z between the upper and the lower magnetic flux collecting flanges 231b, 232b need to be longer than a distance X between the upper and the lower magnetic collecting terminals 231c, 232c.

With this configuration, the magnetic flux collected by the magnetic detection part 230 can be concentrated to the upper magnetic collecting terminal 231c and the lower magnetic collecting terminal 232c.

But, if the distance Y between the upper and the lower magnetic flux collecting rings 231a, 232a is shorter than the distance X between the upper and the lower magnetic collecting terminals 231c, 232c, then the magnetic flux collected by the magnetic detecting part 230 is concentrated between the upper and the lower magnetic flux collecting flanges 231a, 232a, which means a weakening in a strength of the magnetic flux between the upper and the lower magnetic collecting terminals 231c, 232c.

Accordingly, there is an error in a detection value, that is, a lowering in a performance of the torque sensor 200.

Also, the same problem arises when the distance Z between the upper and the lower magnetic flux collecting flanges 231b, 232b is shorter than the distance X between the upper and the lower magnetic collecting terminals 231c, 232c.

Referring to an exploded view in FIG. 22, the upper magnetic collecting terminal 231c extends downwardly from the upper magnetic flux collecting flange 231b, turns radial at the lower end of the upper magnetic flux collecting ring 231a thus extending in the right direction.

The lower magnetic collecting terminal 232c extends upwardly from the lower magnetic flux collecting flange 232b, turns radial at the upper end of the lower magnetic flux collecting ring 232a thus extending in the right direction to correspond to the upper magnetic collecting terminal 231c.

As shown in FIG. 18, the magnetic collecting member holder 233 accommodates at its inner upper and lower parts the upper magnetic collecting member 231 and the lower magnetic collecting member 232 through the insert molding.

Further, as shown in FIG. 17, the magnetic collecting member holder 233 has an upper holder flange 233a and a lower holder flange 233b at its upper and lower ends respectively.

The upper holder flange 233a, as shown in FIG. 18, accommodates the upper magnetic collecting flange 231a of the upper magnetic collecting member 231 therein by insert molding. The lower holder flange 233b accommodates the lower magnetic collecting flange 232a of the lower magnetic collecting member 232 therein by insert molding.

A number of penetrating holes 233h are formed between the upper holder flange 233a and the lower holder flange 233b with a predetermined interval in a circular direction therebetween. Each penetrating hole 233h extends in a vertical direction.

Corresponding to the penetrating holes 233h, as shown in FIG. 21, the upper and the lower magnetic flux collecting flanges 231b, 232b have two kinds of combining holes h1 and h2 of different sizes therebetween.

In this case, the combining holes h1 and h2 of the upper magnetic flux collecting flange 231b are formed to be vertically symmetrical with those of the lower magnetic flux collecting flange 232b.

Therefore, the upper magnetic flux collecting flange 231b and the lower magnetic flux collecting flange 232b have exactly the same shape to enhance an efficiency of a manufacture.

Theses combining holes h1 and h2 are for well positioning of the upper and the lower magnetic collecting members 231 and 232 in a mold during the injection mold of the magnetic detection part 230.

That is, referring to FIG. 21, if supporting pins (not shown) which can pass through a bigger combining hole h1 but cannot pass through a smaller combining hole h2 are located between the upper and the lower magnetic collecting members 231, 232 in the mold, then the smaller combining holes h2 in the upper and the lower magnetic collecting members 231 and 232 are supported upwardly and downwardly by the supporting pins.

Therefore, the upper and the lower magnetic collecting members 231 and 232 can maintain a predetermined vertical distance therebetween during the injection mold.

As accuracy in the positional relation among X, Y, Z described in FIG. 22 has much influence on the magnetic detection part 230 performing collecting, transferring and concentrating the magnetic flux, an injection mold process as described above helps to enhance the accuracy.

In FIG. 21, h3 is for arranging positions of the upper and the lower magnetic collecting members 231 and 232 in the mold.

The magnetic detection sensor part (refer to 240 in FIG. 17) is located between the upper magnetic collecting terminal 231c and the lower magnetic collecting terminal 232c to detect the strength of the magnetic flux formed between the terminals 231c and 232c.

As shown in FIG. 17, the torque sensor 200 has the upper colver 251 and the lower cover 252 to accommodate and support the magnetic force generating part 210, the magnetic shield part 220, the magnetic detection part 230 and the magnetic detection sensor part 240 therein.

Figure 20:
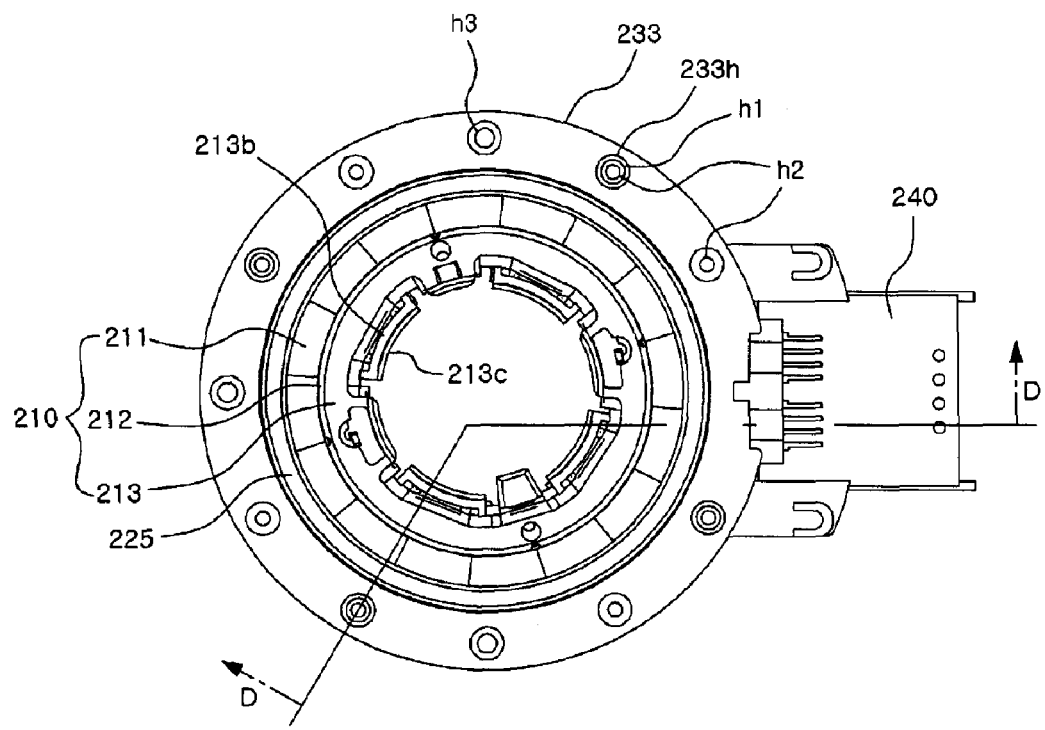
FIG. 20 is a plan view of the contactless torque sensor for a steering system in FIG. 19 (where, FIG. 18 is a sectional view along D-D line in FIG. 20)

Compared to the exploded state of torque sensor 200 in FIG. 17, a perspective view of an assembled state of the torque sensor 200 is shown in FIG. 19 and a plan view of the assembled torque sensor 200 is shown in FIG. 20.

As shown in FIGS. 17, 19 and 20, the magnetic force generating part 210 is located within the magnetic detection part 230 which is externally represented by the magnetic collecting member holder 233.

The magnetic shield part 220 which is externally represented by the shield ring holder 225 is located between the magnetic force generating part 210 and the magnetic detection part 230.

Hereinafter, an operation of the above contactless torque sensor 200 for a steering system according to the second exemplary embodiment of the present invention is described.

FIG. 23 is an imaginary schematic view for explaining the constitutional relation among principal parts of the torque sensor 200 according to the second exemplary embodiment of the present invention. That is, a cylindrical shape is expressed by a 2-dimensional development view.

The upper through holes 222h and the lower through holes 223h of the magnetic shield ring 221 are located to correspond to the magnets of the magnet ring 211 respectively.

The magnetic flux that is generated from the magnet ring 211 passes through the through holes 222h and 223h of the magnet shield ring 221 and reaches the upper magnetic collecting member 231 and the lower magnetic collecting member 232, which are located at the other side, respectively.

Figure 24:
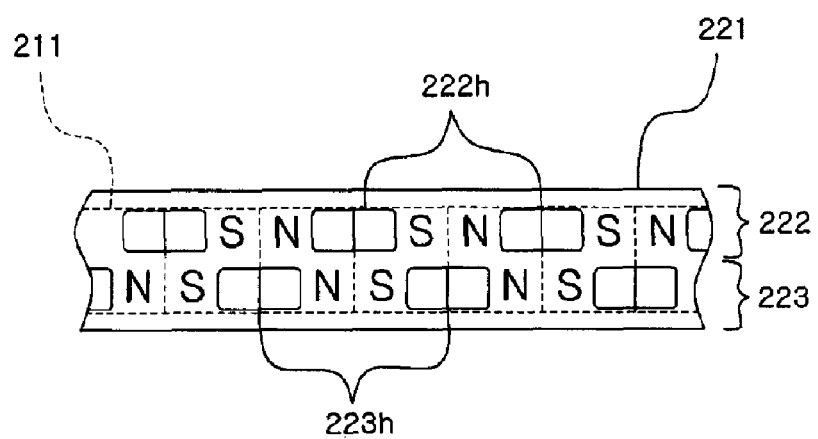
FIG. 24 is a schematic view showing a relation among principal elements of the contactless torque sensor for a steering system according to the second exemplary embodiment of the present invention where the contactless torque sensor is in a neutral state.

The position relation in a normal state, that is in a neutral state, as shown in FIG. 24, is that each of the upper through holes 222h and the lower through holes 223h of the magnetic shield ring 221 extends over a half of the N pole magnet and a half of the S pole magnet with its center at the border of the N pole magnet and the S pole magnet.

Accordingly, the magnetic flux passing through each through hole 222h, 223h has its polarity of N and S with the same amount, so that the magnetic flux collected and concentrated by each of the upper magnetic collecting member 231 and the lower magnetic collecting member 232 is zero respectively.

Therefore, the detected magnetic flux is zero, which means the same rotation angle of the input shaft 60 and the output shaft 70.

Figure 25:
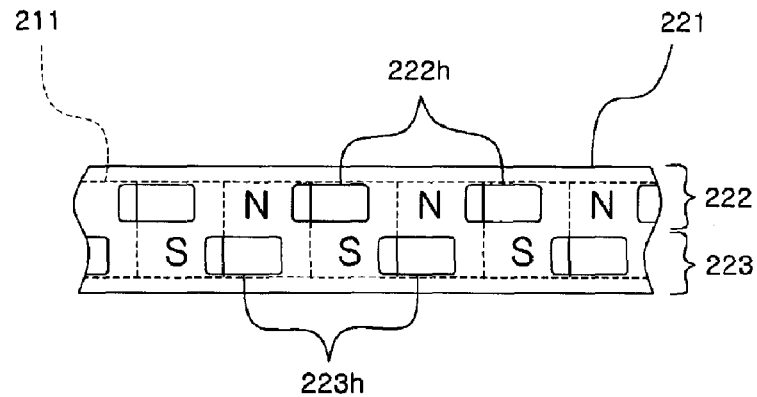
FIGS. 25 to 28 are schematic views showing a relation between principal elements of the contactless torque sensor for a steering system according to the second exemplary embodiment of the present invention where the contactless torque sensor is in a twisted state respectively.
Figure 26:
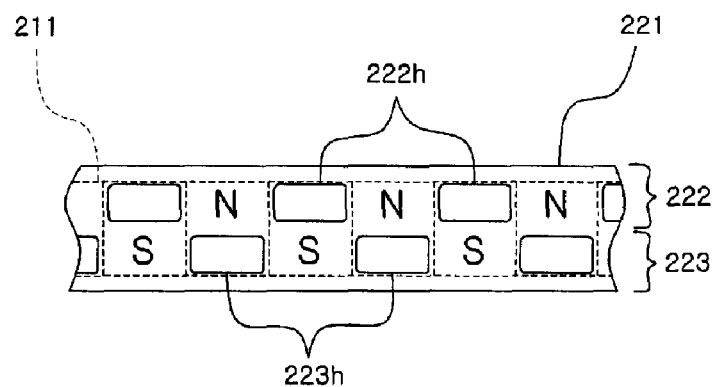

FIG. 25 represents a twist of the input shaft 60 in the left direction with regard to the output shaft 70. FIG. 26 represents a maximum twist of the input shaft 60 in the left direction with regard to the output shaft 70.

As shown in the figure, in the state of FIG. 25, the magnet ring 211 that is fixed to the input shaft 60 is leaning a little bit toward the left with regard to the magnetic shield ring 221 that is fixed to the output shaft 70. So, the magnetic flux passing through the upper through holes 222h has more polarity of S but the magnetic flux passing through the lower through holes 223h has more polarity of N.

Therefore, the upper and the lower magnetic collecting members 231 and 232 receive and collect predetermined magnetic fluxes that are different therebetween, thus resulting in the corresponding value from the detected magnetic flux.

In the state of FIG. 26 which describes the maximum twist, only magnetic flux of S pole passes through all upper through holes 222h and only magnetic flux of N pole passes through all lower through holes 223h, so that the detected magnetic flux becomes of its maximum value.

In this case, it is important that, in the neutral state of FIG. 24 or in the twisted state of FIG. 25 or FIG. 26, the magnetic flux that is induced in the magnetic shield ring 221 is always zero.

That is, in the magnetic shield ring 221, the magnetic flux induced in the upper shield surface 222 always has the opposite polarity but exactly the same magnitude with that induced in the lower shield surface 223. Also, the upper shield surface 223 and the lower shield surface 223 are formed integrally therebetween. Accordingly, the sum of the magnetic flux in the magnetic shield ring 221 always becomes zero.

Therefore, there is no second magnetic induction to be generated in the upper and the lower magnetic collecting members 231 and 232 due to the magnetic shield ring 221.

Figure 27:
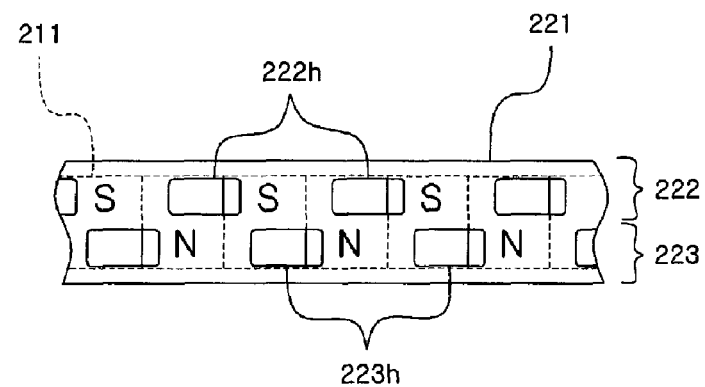
Figure 28:
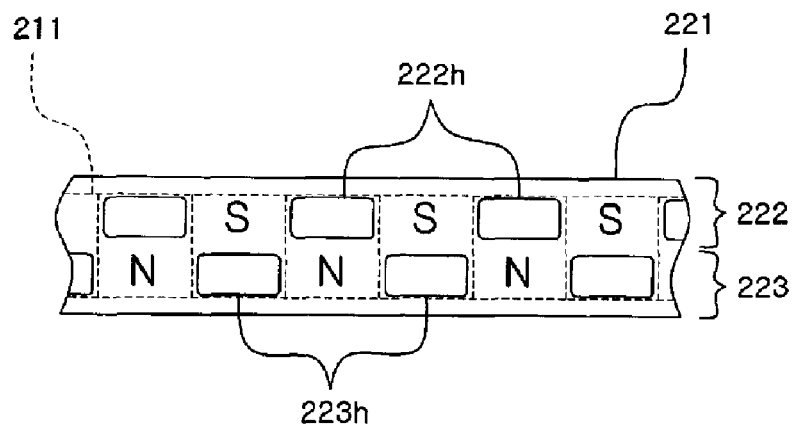

FIG. 27 represents that the input shaft 60 is twisted to the right with regard to the output shaft 70. FIG. 28 represents that the input shaft 60 is twisted to its maximum to the right with regard to the output shaft 70.

As the states of FIG. 27 and FIG. 28 are exactly opposite to those of FIG. 25 and FIG. 26, their description can be inferred enough from the above description and is omitted herein.

Figure 29:
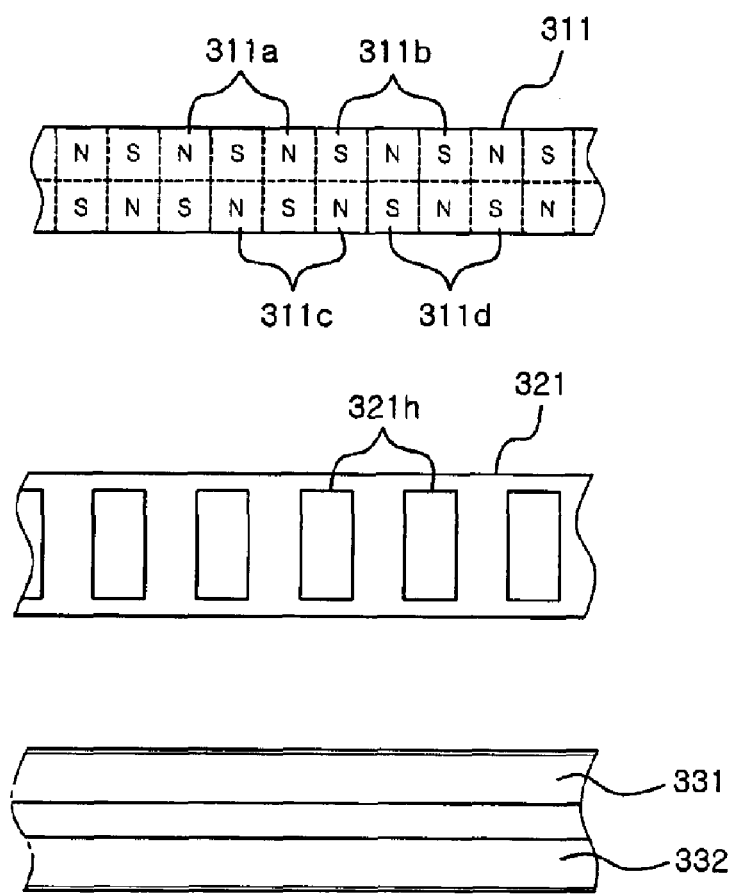
FIG. 29 is a schematic exploded view for explaining modified embodiments of principal elements of the contactless torque sensor for a steering system according to the second exemplary embodiment of the present invention.

FIG. 29 is an imaginary schematic view showing a modified embodiment of principal elements of the torque sensor according to the second exemplary embodiment of the present invention.

In FIG. 29, a cylinder shape is described in a 2-dimensional exploded view as that was in FIG. 23.

In this modified embodiment, the magnet ring 311 of the magnetic force generating part includes an upper magnet where N pole magnets 311a and S pole magnets 311b are disposed in turn therebetween in the circular direction, and likewise an lower magnet where N pole magnets 311c and S pole magnets 311d are disposed in turn therebetween in the circular direction.

In this case, the magnets that neighbor between the upper magnets 311a, 311b and the lower magnets 311c, 311d are disposed to have the opposite polarities therebetween. That is, each of the N pole magnet and the S pole magnet has its polarity opposite to the polarities of the left and the right neighboring magnets and to the polarities the upper or the lower neighboring magnet.

Corresponding to the magnetic force generating part as described above, the magnetic shield part comprises a magnetic shield ring 321 having through holes 321h each of which extends vertically to have a size of a sum of one upper magnet 311a or 311b and its neighboring one lower magnet 311c or 311d as it can be seen in FIG. 29.

The through holes 321h are formed as a plural number provided in a circular direction with an interval that corresponds to the width of one N or S pole magnet.

With this configuration, the magnetic flux generated from the magnet ring 311 passes through the through holes 321h of the magnetic shield ring 321 and reaches the upper magnetic collecting member 331 and the lower magnetic collecting member 332 respectively.

Figure 30:
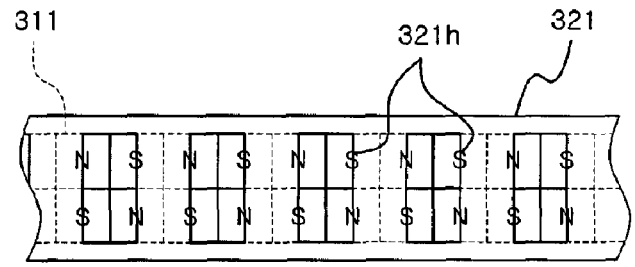
FIG. 30 is a schematic view showing a relation of the modified embodiments of the principal elements in FIG. 29 where the contactless torque sensor for a steering system is in its neutral state.

In this case, in a normal state, that is in a neutral state, as shown in FIG. 30, each through hole 321h of the magnetic shield ring 321 extends over a half of the N pole magnet and a half of the S pole magnet with its center at the border of the N pole magnet and the S pole magnet.

Accordingly, the magnetic flux passing through each through hole 321h has its polarity of N and S with the same amount, so that the magnetic flux collected and concentrated by each of the upper magnetic collecting member (331 in FIG. 29) and the lower magnetic collecting member (332 in FIG. 29) is zero respectively.

Therefore, the detected magnetic flux is zero, which means the same rotation angle of the input shaft and the output shaft.

Figure 31:
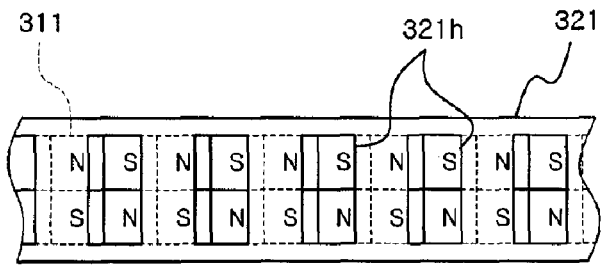
FIGS. 31 to 34 are schematic views showing a relation between the modified embodiments of the principal elements in FIG. 29 where the contactless torque sensor is in a twisted state respectively.
Figure 32:
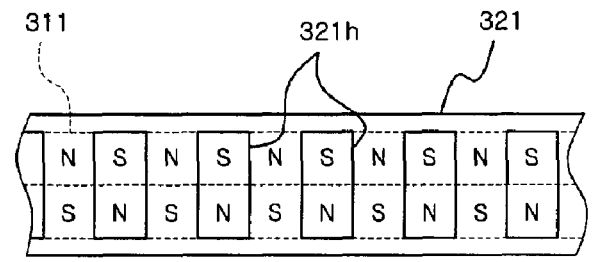

FIG. 31 represents a twist of the input shaft 60 in the left direction with regard to the output shaft 70. FIG. 32 represents a maximum twist of the input shaft 60 in the left direction with regard to the output shaft 70.

As shown in the figure, in the state of FIG. 31, the magnet ring 311 that is fixed to the input shaft 60 is leaning a little bit toward the left with regard to the magnetic shield ring 321 that is fixed to the output shaft 70.

At this time, if each through hole 321h is imaginarily cut into two parts along its horizontal center line, the magnetic flux passing through the upper parts of the through holes 321h has more polarity of S but the magnetic flux passing through the lower parts of the through holes 321h has more polarity of N.

Therefore, the upper and the lower magnetic collecting members 231 and 232 receive and collect predetermined magnetic fluxes that are different therebetween, thus resulting in the corresponding value from the detected magnetic flux.

In the state of FIG. 32 which describes the maximum twist, only magnetic flux of S pole passes through all upper parts of the through holes 321h and only magnetic flux of N pole passes through all lower parts of the through holes 321h, so that the detected magnetic flux becomes of its maximum value.

In this modified embodiment, as it was also described in the above embodiment, the magnetic flux that is induced in the magnetic shield ring 321 is always zero regardless of whether it is in the neutral state of FIG. 30 or whether it is in the twisted state of FIG. 31 or FIG. 32.

That is, if the magnetic shield ring 321 is imaginarily cut into two parts along a horizontal center line, the magnetic flux induced in the upper part always has the opposite polarity but exactly the same magnitude with that induced in the lower part. Also, the upper part and the lower part form one integral magnetic shield ring 321. Accordingly, the sum of the magnetic flux in the magnetic shield ring 321 always becomes zero.

Therefore, there is no second magnetic induction to be generated in the upper and the lower magnetic collecting members 331 and 332 due to the magnetic shield ring 321.

Figure 33:
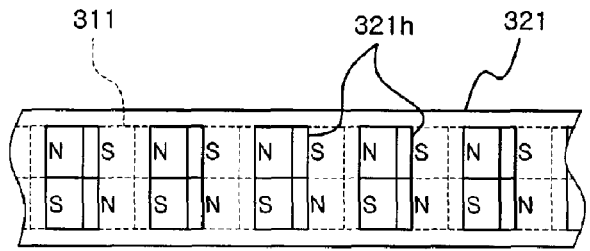
Figure 34:
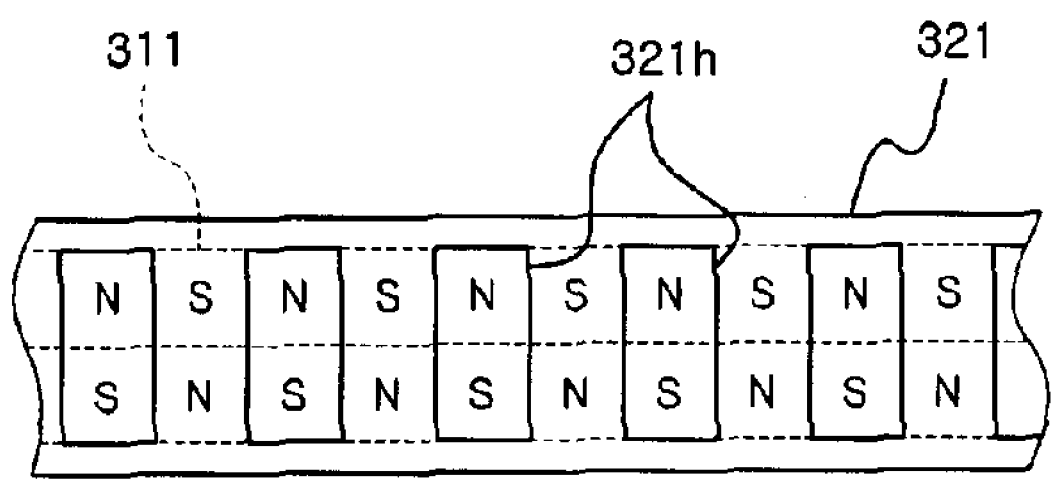

FIG. 33 represents that the input shaft 60 is twisted to the right with regard to the output shaft 70. FIG. 34 represents that the input shaft 60 is twisted to its maximum to the right with regard to the output shaft 70.

As the states of FIG. 33 and FIG. 34 are exactly opposite to those of FIG. 31 and FIG. 32, their description can be inferred enough from the above description and is omitted herein.

The above described contactless torque sensors 100 and 200 for a steering system are only exemplary embodiments to help understand the present invention and are not to be understood as limiting a scope of patent right or a scope of technology of the present invention.

The scope of patent right or the scope of technology of the present invention is defined by the appended claims and their equivalents.

The invention claimed is:

1. A contactless torque sensor for a steering system, which is installed between an input shaft connected to a steering wheel and an output shaft connected to a vehicle wheel to detect a twist generated by rotational operation of the steering wheel, comprising:

a magnetic force generating part coupled to the input shaft and having a plurality of N pole magnets and S pole magnets alternatively on an outer circumferential surface thereof;

a magnetic shield part having a shape of a hollow cylinder, coupled to the output shaft and having a plurality of holes to be located within areas of the N pole magnets and the S pole magnets;

a magnetic detection part provided at a distance from an outer surface of the magnetic shield part and detecting a magnetic force passing through a plurality of the holes; and a magnetic detection sensor part located at an outer surface of the magnetic detection part to detect a change of a relative twist between the magnetic force generating part and the magnetic shield part, wherein the magnetic shield part comprises a first magnetic shield part that has first through holes formed at a predetermined interval therebetween on an upper outer surface and a second magnetic shield part that has second through holes formed at a predetermined intervals therebetween on a lower outer surface to be alternately disposed with the first through holes, wherein the magnetic detection part comprises a first magnetic detection member that detects a magnetic force passing through the first through holes, and a second magnetic detection member that is located at a distance from a lower side of the first magnetic detection member and detects the magnetic force passing through the second through holes.

2. The contactless torque sensor for a steering system according to claim 1, wherein the magnetic force generating part comprises a coupling part that is fixed to a lower end part of the input shaft and a magnetic attaching part that is located at a lower side of the attaching part and has a shape of a cylinder, and the a plurality of the N pole magnets and the S pole magnets are attached on an outer surface of the magnetic attaching part.

3. The contactless torque sensor for a steering system according to claim 1, wherein, if the output shaft rotates to the same amount as the input shaft and a twist angle therebetween is zero, a border part between the N pole magnet and the S pole magnet is located at a horizontal center of the hole.

4. The contactless torque sensor for a steering system according to claim 1, wherein, if the output shaft rotates to its maximum amount in the left or in the right with regard to the input shaft, one of the N pole magnet and the S pole magnet is exposed through the first through hole and the other of the N pole magnet and the S pole magnet is exposed through the second through hole.

5. The contactless torque sensor for a steering system according to claim 1, wherein each of the first through holes and the second through holes has the same hole area.

6. The contactless torque sensor for a steering system according to claim 5, wherein a height of an upper end of the N and S pole magnets and the height of an upper end of the magnet detection part are the same as that of an upper end of the first through hole, and a height of a lower end of the N and S pole magnets and the height of the lower end of magnet detection part are the same as that of a lower end of the second through hole.

7. The contactless torque sensor for a steering system according to claim 5, wherein a height of an upper end of the N and S pole magnets and the height of an upper end of the magnet detection part are different from that of an upper end of the first through hole, and a height of a lower end of the N and S pole magnets and the height of the lower end of magnet detection part are different from that of a lower end of the second through hole.

8. The contactless torque sensor for a steering system according to claim 1, wherein the magnetic detection part further comprises a first magnetic collecting ring provided at an outer surface of the first magnetic detection member and a second magnetic collecting ring provided at the outer surface of the second magnetic detection member to maximize the magnetic force induced by the magnetic force generating part.

9. The contactless torque sensor for a steering system according to claim 8, wherein one or more of the magnetic detection sensor part is coupled to the first magnetic collecting ring and the second magnetic collecting ring.

10. The contactless torque sensor for a steering system according to claim 9, wherein the magnetic detection part comprises a first protruding member that protrudes from an outer surface of the first magnetic collecting ring in an outer direction and a second protruding member that protrudes from the outer surface of the second magnetic collecting ring in the outer direction to correspond vertically to the first protruding member, and the magnetic detection sensor part is located between the first protruding member and the second protruding member.

11. The contactless torque sensor for a steering system according to claim 10, wherein the first protruding member is provided as a plural number at the outer surface of the first magnetic collecting ring, the second protruding member is provided as a plural number at the outer surface of the second magnetic collecting ring, and the magnetic detection sensor part is located between each first protruding member and each second protruding member.

12. The contactless torque sensor for a steering system according to claim 1, wherein the magnetic shield part has the first magnetic shield part and the second magnetic shield part manufactured integrally therebetween.

13. The contactless torque sensor for a steering system according to claim 1, wherein the magnetic force generating part has at its upper outer surface the N pole magnets and the S pole magnets disposed alternately therebetween, and another S pole magnets are disposed at a lower side of the N pole magnets and another N pole magnets are disposed at a lower side of the S pole magnets.

14. The contactless torque sensor for a steering system according to claim 13, wherein the magnetic shield part has the holes at every border part of the N pole and the S pole magnets disposed at the upper outer surface and the N pole and the S pole magnets disposed at the lower outer surface.

15. A contactless torque sensor for a steering system, which is installed between an input shaft connected to a steering wheel and an output shaft connected to a vehicle wheel to detect a twist generated by rotational operation of the steering wheel, comprising:

a magnetic force generating part coupled to the input shaft and having a plurality of N pole magnets and S pole magnets alternatively on an outer circumferential surface thereof;

a magnetic shield part as a single hollow cylinder disposed at an radially outer side of the magnetic force generating part and coupled to the outer shaft, including an upper shield surface that has a plurality of upper through holes at an interval therebetween to be the same as that between one of the N pole magnets and the S pole magnets and a lower shield surface that has a plurality of lower through holes at an interval therebetween to be the same as that between the other of the N pole magnets and the S pole magnets;

a magnetic detection part including an upper magnetic collecting member which has an upper magnetic flux collecting ring collecting a magnetic flux that passes through the upper shield surface, an upper magnetic flux collecting flange extending radially from an upper end of the upper magnetic flux collecting ring to a predetermined width and an upper magnetic collecting terminal bent from a side part of the upper magnetic flux collecting flange, and a lower magnetic collecting member which has a lower magnetic flux collecting ring collecting a magnetic flux that passes through the lower shield surface, a lower magnetic flux collecting flange extending radially from a lower end of the lower magnetic flux collecting ring to a predetermined width and a lower magnetic collecting terminal bent from a side part of the lower magnetic flux collecting flange, where a distance between the upper magnetic flux collecting ring and the lower magnetic flux collecting ring and the distance between the upper magnetic flux collecting flange and the lower magnetic flux collecting flange are longer than the distance between the upper magnetic collecting terminal and the lower magnetic collecting terminal; and a magnetic detection sensor part located between the upper magnetic collecting terminal and the lower magnetic collecting terminal to detect an intensity of a magnetic flux, wherein the magnetic detection part has the upper magnetic collecting flange to extend from the upper end of the upper magnetic flux collecting ring and the lower magnetic collecting flange to extend from the lower end of the lower magnetic flux collecting ring, and the upper magnetic collecting terminal extends downwardly from the upper magnetic flux collecting flange, passes through the lower end of the upper magnetic flux collecting ring and is bent and extends radially and the lower magnetic collecting terminal extends upwardly from the lower magnetic flux collecting flange, passes through the upper end of the lower magnetic flux collecting ring and is bent and extends radially to correspond to the upper magnetic collecting terminal.

16. The contactless torque sensor for a steering system according to claim 15, wherein the magnetic detection part further includes a magnetic collecting member holder of a non-ferromagnetic substance having a shape of a hollow cylinder and having an upper surface to be coupled to the upper magnetic collecting member and a lower surface to be coupled to the lower magnetic collecting member.

17. The contactless torque sensor for a steering system according to claim 16, wherein the magnetic collecting member holder has at its upper and lower surfaces an upper holder flange which is coupled to the upper magnetic flux collecting flange and a lower holder flange which is coupled to the lower magnetic flux collecting flange respectively.

18. The contactless torque sensor for a steering system according to claim 16, wherein the upper magnetic collecting member and the lower magnetic collecting member are coupled to the magnetic collecting member holder by insert molding.

19. The contactless torque sensor for a steering system according to claim 17, wherein the upper magnetic flux collecting flange and the lower magnetic flux collecting flange respectively have two kinds, in size, of combining holes which are formed to be vertically symmetrical between the upper magnetic flux collecting flange and the lower magnetic flux collecting flange, and the upper holer flange and the lower holder flange respectively have a number of penetrating holes extending vertically and corresponding to the combining holes that are formed at the upper magnetic flux collecting flange and the lower magnetic flux collecting flange.

20. The contactless torque sensor for a steering system according to claim 15, wherein the magnetic force generating part includes a magnet ring comprising a plurality of the N pole magnets and the S pole magnets and a magnet holder of a non-ferromagnetic substance having an attaching part which accommodates and supports the magnet ring at its outer surface and a plurality of first coupling pieces which are provided at an upper side of the attaching part and extends axially to accommodate the input shaft inside thereof.

21. The contactless torque sensor for a steering system according to claim 20, wherein the magnetic force generating part further includes a back yoke of a ferromagnetic substance provided between the magnet ring and the magnet holder and having a ring shape with an outer surface to be attached to the magnet ring and an inner surface to be fixedly attached to the attaching part of the magnet holder.

22. The contactless torque sensor for a steering system according to claim 20, wherein each first coupling piece has a connecting protrusion formed on an inner side thereof to be coupled to the input shaft and the magnetic force generating part further includes a first snap ring to prevent each first coupling piece from being bent outwardly when the first coupling pieces are coupled to the input shaft.

23. The contactless torque sensor for a steering system according to claim 15, wherein the magnetic shield part further includes a shield ring holder of a non-ferromagnetic substance having a holding part of a hollow cylinder shape which accommodates and supports the magnetic shield ring with an inner surface thereof and a plurality of second coupling pieces which are provided at a lower side of the holding part and extends axially to accommodate the output shaft inside thereof.

24. The contactless torque sensor for a steering system according to claim 23, wherein the holding part has a number of connecting protrusion formed on an inner side thereof to be inserted correspondingly into the upper and the lower through holes of the magnetic shield ring.

25. The contactless torque sensor for a steering system according to claim 23, wherein the magnetic shield ring is coupled to the shield ring holder by insert molding.

26. The contactless torque sensor for a steering system according to claim 23, wherein each second coupling piece has a connecting protrusion formed on a lower end inner side thereof to be coupled to the output shaft and the magnetic shield part further includes a second snap ring to prevent each second coupling piece from being bent outwardly when the second coupling pieces are coupled to the output shaft.

27. The contactless torque sensor for a steering system according to claim 15 further comprising an upper cover and a lower cover which are provided at the upper and lower sides to accommodate and support the magnetic force generating part, the magnetic shield part, the magnetic detection part and the magnetic detection sensor part therein.

28. A contactless torque sensor for a steering system, which is installed between an input shaft connected to a steering wheel and an output shaft connected to a vehicle wheel to detect a twist generated by rotational operation of the steering wheel, comprising:

a magnetic force generating part coupled to the input shaft and having a plurality of N pole magnets and S pole magnets disposed alternatively on an upper and an lower outer circumferential surface thereof respectively and having the opposite poles between neighboring upper and lower magnets;

a magnetic shield part coupled to the outer shaft and having a magnetic shield ring as a single hollow cylinder disposed at an radially outer side of the magnetic force generating part, the magnetic shield ring having a plurality of through holes each of which has a size to accommodate one upper magnet and one lower magnet therein and which are disposed in a circumferential direction at an interval therebetween to be the same as that between one of the upper magnets and the lower magnets;

a magnetic detection part including an upper magnetic collecting member which has an upper magnetic flux collecting ring collecting a magnetic flux that passes through the upper shield surface, an upper magnetic flux collecting flange extending radially from an upper end of the upper magnetic flux collecting ring to a predetermined width and an upper magnetic collecting terminal bent from a side part of the upper magnetic flux collecting flange, and a lower magnetic collecting member which has a lower magnetic flux collecting ring collecting a magnetic flux that passes through the lower shield surface, a lower magnetic flux collecting flange extending radially from a lower end of the lower magnetic flux collecting ring to a predetermined width and a lower magnetic collecting terminal bent from a side part of the lower magnetic flux collecting flange, where a distance between the upper magnetic flux collecting ring and the lower magnetic flux collecting ring and the distance between the upper magnetic flux collecting flange and the lower magnetic flux collecting flange are longer than the distance between the upper magnetic collecting terminal and the lower magnetic collecting terminal; and a magnetic detection sensor part located between the upper magnetic collecting terminal and the lower magnetic collecting terminal to detect an intensity of a magnetic flux.

29. The contactless torque sensor for a steering system according to claim 28, wherein the magnetic detection part has the upper magnetic collecting flange to extend from the upper end of the upper magnetic flux collecting ring and the lower magnetic collecting flange to extend from the lower end of the lower magnetic flux collecting ring, and the upper magnetic collecting terminal extends downwardly from the upper magnetic flux collecting flange, passes through the lower end of the upper magnetic flux collecting ring and is bent and extends radially and the lower magnetic collecting terminal extends upwardly from the lower magnetic flux collecting flange, passes through the upper end of the lower magnetic flux collecting ring and is bent and extends radially to correspond to the upper magnetic collecting terminal.

30. The contactless torque sensor for a steering system according to claim 29, wherein the magnetic detection part further includes a magnetic collecting member holder of a non-ferromagnetic substance having a shape of a hollow cylinder and having an upper surface to be coupled to the upper magnetic collecting member and a lower surface to be coupled to the lower magnetic collecting member by insert molding respectively.

31. The contactless torque sensor for a steering system according to claim 28, wherein the magnetic force generating part includes a magnet ring comprising a plurality of the upper magnets and the lower magnets and a magnet holder of a non-ferromagnetic substance having an attaching part which accommodates and supports the magnet ring at its outer surface and a plurality of first coupling pieces which are provided at an upper side of the attaching part and extends axially to accommodate the input shaft inside thereof.

32. The contactless torque sensor for a steering system according to claim 31, wherein the magnetic force generating part further includes a back yoke of a ferromagnetic substance provided between the magnet ring and the magnet holder and having a ring shape with an outer surface to be attached to the magnet ring and an inner surface to be fixedly attached to the attaching part of the magnet holder.

33. The contactless torque sensor for a steering system according to claim 28, wherein the magnetic shield part further includes a shield ring holder of a non-ferromagnetic substance having a holding part of a hollow cylinder shape which accommodates and supports the magnetic shield ring with an inner surface thereof and a plurality of second coupling pieces which are provided at a lower side of the holding part and extends axially to accommodate the output shaft inside thereof and which is coupled to the magnetic shield ring by insert molding.

* * * * *